United States Patent [19]

Gast et al.

[11] 4,393,399
[45] Jul. 12, 1983

[54] METHOD AND APPARATUS FOR PARTIAL ELECTRONIC RETOUCHING OF COLORS

[75] Inventors: Uwe Gast, Rammsee; Eberhard Hennig, Ascheberg; Dieter Preuss; Heinz Taudt, both of Kiel; Klaus Wellendorf, Heikendorf, all of Fed. Rep. of Germany

[73] Assignee: Dr. -Ing. Rudolf Hell GmbH, Fed. Rep. of Germany

[21] Appl. No.: 229,584

[22] PCT Filed: May 17, 1980

[86] PCT No.: PCT/DE80/00070
§ 371 Date: Jan. 18, 1981
§ 102(e) Date: Jan. 8, 1981

[87] PCT Pub. No.: WO80/02607
PCT Pub. Date: Nov. 27, 1980

[30] Foreign Application Priority Data
May 18, 1979 [DE] Fed. Rep. of Germany ....... 2920058

[51] Int. Cl.³ .............................................. H04N 1/46
[52] U.S. Cl. ........................................ 358/80; 358/78
[58] Field of Search ............................. 358/75, 78, 80

[56] References Cited
U.S. PATENT DOCUMENTS

| | | | |
|---|---|---|---|
| 3,893,166 | 7/1975 | Pogsley | 358/80 |
| 4,007,362 | 2/1977 | Sindermann | |
| 4,092,668 | 5/1978 | Knop | 358/78 |
| 4,189,741 | 2/1980 | Klopsch | 358/80 |
| 4,204,223 | 5/1980 | Gast et al. | |
| 4,258,385 | 3/1981 | Greenberg | 358/80 |
| 4,285,009 | 8/1981 | Klopsch | 358/80 |

Primary Examiner—Michael A. Masinick
Attorney, Agent, or Firm—Hill, Van Santen, Steadman, Chiara & Simpson

[57] ABSTRACT

Apparatus and method for electronically retouching color images reproductions in which the color signals are generated by means of scanning image point by image point and by trichromatic master scanning and then the signals are digitized and the digital color values of the individual color components are stored in a storage medium and the stored color values are then changed by identifying the coordinates of the image points to be changed in the color image and simultaneously determining the coordinate identification and the locally dependent correction values for the digital color values of the color components and then changing the digital color values by applying correction values at the correction locations so as to obtain the retouched color values.

31 Claims, 23 Drawing Figures

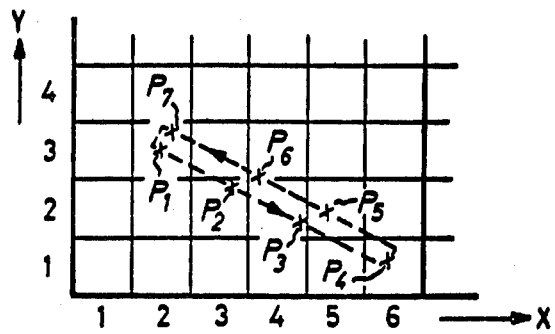
*Fig. 3a*
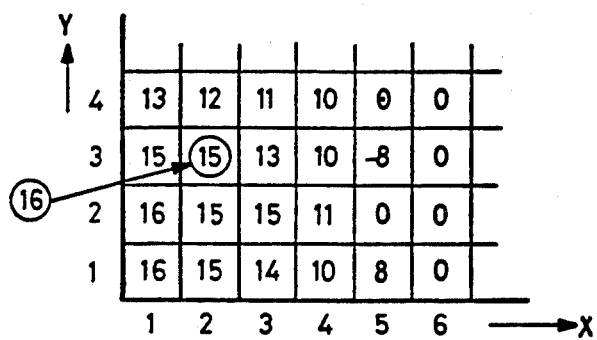
*Fig. 3b*
*Fig. 3c*
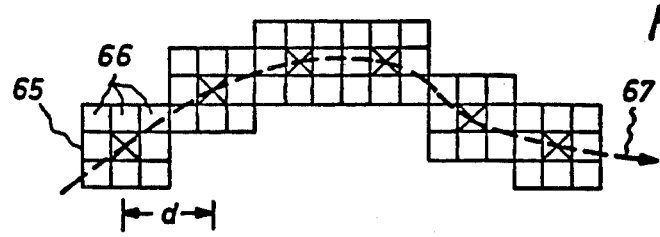
*Fig. 4*

CORRECTION VALVE GENERATOR 40

METHOD AND APPARATUS FOR PARTIAL ELECTRONIC RETOUCHING OF COLORS

BACKGROUND OF THE INVENTION

TECHNICAL FIELD

The present invention relates to electronic reproduction technology, particularly to a method for partial electronic retouching in color image reproduction in which the color signals generated by means of image-point-wise and trichromatic master scanning are digitized and the digital color values of the individual color components are deposited in a storage medium and in which the stored color values are altered under control; the present invention also relates to a circuit arrangement for implementing the method.

UNDERLYING PRIOR ART

In electronic color reproduction, three primary color measurement signals which represent the color components red, green and blue of the scanned image points are gained in a color scanner by means of point-wise and line-wise opto-electronic scanning of colored masters and by means of spectral color splitting. A color correction computer corrects the color measurement values according to the laws of subtractive color mixing and generates the color separation signals which are a measure for the amounts of printing ink required in the subsequent printing.

The color separation signals are digitized and are deposited as color data in a storage medium in order to record the color separation, if need be, at a later point in time or at some other location or, on the other hand, in order to unite the color data of different individual masters according to a lay-out plan into a data set which corresponds to an overall page.

In order to record the color separation, the color data of the individual masters or of the overall page are read out of the storage medium, are reconverted into analog color separation signals and are supplied to write lamps as recording elements, the light intensities of said lamps being modulated by the appertaining color separation signals. The write lamps expose a recording medium in the form of films point and line wise, said films, after being developed, representing the desired rasterred or unrastered color separations "yellow", "magenta", "Cyan" and "black" for the production of the printing forms.

In the reproduction process, later, partial retouching (corrections of color and/or tint value) are frequently necessary, whether to optimize the correction carried out in the color correction computer or to take, on the other hand, editorial changes and client's wishes into consideration. The retouching, for example, is a matter of incorporating highlights by means of brightening, of working up shadow passages by means of darkening, of improving the drawing by means of brightening and darkening or, simply, of color changes.

Whereas the correction of a color undertaken by the color correction computer takes effect everywhere said color occurs in the master or in the reproduced image, such a retouching is to be limited to selectable, topically limited image areas. Added thereto is the fact that the color influence within the image areas should frequently also be bleeding, i.e., gradually increasing or decreasing, in order, for example, to achieve soft contours or to produce half shadows.

These retouchings are executed in reproduction technology either manually with a retouch pencil in the master itself (master retouching) or, on the other hand, are executed in the individual color separations (separation retouching).

Typical work in master retouching, also called color retouching, are the re-coloring and darkening by means of partial application of glazing or covering retouch inks with the retouch brush, whereby only the color saturation is often to be increased without changing the tint. Likewise, the brightening of image passages by means of bleaching the color layers in the color material with suitable chemicals. It turns out that a re-coloring can only be carried out in such colors as arise by means of subtractive mixing of master colors and retouch colors. Thereby, the selection of the retouch color presumes great experience. Re-coloring in a complementary color is practically impossible. Bleaching can lead to disruptive tint shifts.

New color separations of the retouched master must be produced by means of a color scanner. Retouch colors and master colors frequently exhibit different spectral distributions so that, despite visual color coincidence, they are differently reproduced in the color scanner, since the color separation properties in the color scanner do not correspond to the physiological sensitivity of the eye.

Typical work in separation retouching in a half-tone color separation are darkening by means of applying a ray retouch color and brightening with chemical reducers. Retouch color or, respectively, reducers must be applied with a very wet retouch brush, so that contours which are true to the edge are difficult to achieve. Given a raster color separation, only a diminution of the raster points (brightening) can be achieved in a conventional manner without extensive copying work only by means of a so-called point etching.

In order to evaluate the retouch work, sample prints must be produced since, particularly given separation retouchings, the effect on the colored final product is not directly perceptible.

It has been shown that extensive retouching is still necessary even given an electronic reproduction process, said retouching having previously been executed purely manually with the retouch brush, presuming great experience, being expensive and time-consuming, and, in part, only able to be incompletely executed.

A method is already known from the U.S. Pat. No. 4,007,362 (German OS No. 24 30 762) with which later color corrections can be executed in image areas by means of changing the stored image information. An operator selects the positional coordinates of the image points in the image to be corrected by means of a coordinate identification device, whereby the address-wise access to the stored image information is created. The operator then inputs the desired correction amounts into a computer via the keys of an operating unit, said computer converting the stored image information into the altered image information by means of evaluation with multiplicative or additive magnitudes.

Although partial color corrections can be executed with the known method by means of inputting individual correction amounts, results such as in conventional retouching with the retouch brush can hardly be achieved, which is viewed as being disadvantageous. For example, it may well be difficult with the known method to create the bleeding corrections with a gradually increasing or decreasing influence which are frequently desired in praxis without distruptive density skips such as, for example, a half shadow.

Further, it is viewed as being disadvantageous that an opaque or translucent master coinciding in format with the image to be reproduced must be stretched on the coordinate indentification device in order to identify the positional coordinates. Such masters often do not exist, since the original masters seldom conicide with the final format and the electronic enlargement to the final format is only carried out in the color scanner. Although it is specified in the said letters patent that the coordinate identification can ensue without an opaque or translucent master by means of a light pen at the picture screen of the monitor, this type of coordinate identification has the disadvantage that, due to the lesser resolution, only a rough correction ensues. Moreover, it cannot be derived from the letters patent as to how the correction method is to be carried out in detail.

SUMMARY OF THE INVENTION

It is therefore the object of the present invention to specify a method and a circuit arrangement for color image reproduction with which, in particular, bleeding retouchings as in conventional retouching with the retouch brush can be achieved and with which, beyond that, corrections are made possible which cannot be executed with conventional retouching.

This object, given the present invention, is achieved in that the locus coordinates of the image points to be changed in the color image are identified, in that, simultaneously in the coordinate identification, location-dependent correction values ($Y_R$, $M_R$, $C_R$, $K_R$) for the ditital color values (Y, M, C, K) of the color components to be changed are determined for each pair of coordinates, and in that the digital color values (Y, M, C, K) are changed by means of the locationally allocated correction values ($Y_R$, $M_R$, $C_R$, $K_R$) in order to obtain the retouched color values (Y', M', C', K').

It is preferably provided that color increments ($\Delta Y$, $\Delta M$, $\Delta C$, $\Delta K$) are fixed for the color components to be changed, said color increments respectively representing the smallest alteration amounts for the color values (Y, M, C, K); that the locus coordinates (x, y) of the image points to be changed in the color image are identified and at least one retouch factor (r) is determined for determining the retouch strength of each pair of coordinates identified (x, y), said retouch factor specifying the plurality of color increments to be summed up for each image point to be retouched; that the retouch factor is multiplied with the individual color increments in order to form location-dependent, digital correction values ($Y_R$, $M_R$, $C_R$, $K_R$); and that the digital color values are changed by means of the locationally allocated correction values in order to obtain the retouched color values (Y', M', C', K').

Preferably, the digital color values are read out of the storage medium, are changed by the correction values, and the retouched color values are reinscribed onto the storage medium after accomplishment of the retouching.

In an advantageous manner, the correction values are added to (positive retouching) or, respectively, are subtracted from (negative retouching) the locationally allocated digital color values.

A further development of the invention consists therein that the locus coordinates of the image points to be retouched are determined in a coordinate identification device by means of marking the locationally allocated points with a marking device, particularly with a coordinate pin.

Preferably, the retouch factors of the image points of the color image to be retouched are determined from the number of contacts of the corresponding points with the marking device of the coordinate identification device, whereby the marking device is guided like a retouch brush across that area of the coordinate identification device which corresponds to the image area of the color image to be retouched.

An advantageous variation consists therein that the retouch factors for the image points of the color image to be retouched are determined from the pressure of the marking device on the corresponding points of the coordinate identification device.

Another advantageous variation consists therein that the retouch factors for the image points of the color image to be retouched are determined from the dwell time of the marking device on the corresponding points of the coordinate identification device.

Preferably, the retouch factors are increased or lowered by an amount at each contacting, whereby the appertaining correction values increase (intensification of the retouching) or decrease (reversal of the retouching).

It is alternately provided that the retouch factors are increased given an increase of pressure and are lowered given a decrease of pressure, whereby the appertaining correction values increase (intensification of the retouching) or decrease (reversal of the retouching) or, respectively, that the retouch factors are increased or lowered by an amount in accord with the respective dwell time, whereby the appertaining correction values increase (intensification of the retouching) or decrease (reversal of the retouching).

An advantageous further development consists therein that, optionally, the unretouched color image (original image) or the retouched color image are displayed on a color monitor for visual control, that a displaceable light mark is mixed in in the picture screen, and that the movement of the light mark is synchronized with the movement of the marking device of the coordinate identification device.

To that end, it is provided that the digital color values of the color image are loaded from the storage medium into an image repetition memory and that the image repetition memory is cyclically read out for the pointwise recording of the color image on the monitor.

One embodiment of the invention provides that the identified retouch factors of the individual image points of the color image are over-written into a retouch memory, that the retouch memory is read out synchronously with the image repetition memory for the locational allocation of color values and correction values, and that the digital color values are altered by the allocated correction values.

An advantageous improvement is that the retouch factors changed by the retouch operation are respectively over-written into the retouch memory in a blanking gap of the image recording.

Another advantageous improvement consists therein that the retouch effect which is respectively achieved with a change amount lies below the visible limit and that the significance of the digital color increments is selected smaller than the significance of the least significant bit (LSB) of the digital color values.

In an advantageous manner, each component of a prescribed color is subdivided into the same plurality of corresponding color increments for determining the smallest amounts of change.

Alternatively, it is provided that each component of a color measured in the color image is subdivided into the same plurality of corresponding color increments for determining the smallest amounts of change.

On the other hand, it is proposed that each component of a color difference formed of a target color and of an initial color is subdivided into the same plurality of corresponding color increments for determining the smallest amounts of change.

In an advantageous manner, the color increments are formed as quotients from the respective final correction values of the individual color components and of the plurality of contactings with which the final correction values are to be achieved.

Preferably, the final correction values correspond to the differential values formed of the target color and of the initial color.

Alternatively, the final correction values correspond to the color components of a retouch color to be applied to an initial color in order to obtain the desired target color.

Preferably, the initial color and the target color are a separation color.

An advantageous retouching method provides that an initial color is brightened by means of subtraction of correction values from the color values of said initial color, whereby the target color is "white".

Another advantageous retouching method consists therein that an initial color is darkened by means of the addition of correction values to the color values of said initial color, whereby the target color is "black".

In a further retouching method, it is proposed that the color components of the initial color to be darkened rise in terms of proportion due to the retouching until the greatest color component of the initial color has reached the maximum density, and that, given continued retouching, the chromatic color components (Y, M, C) retain the values they achieved given their maximum density and only the achromatic color component (K) increases up to its maximum density (black).

An alternative retouching method provides that the color components of the initial color to be darkened increase in proportion due to the retouching until the greatest color component of the initial color has reached its maximum density, and that, given continued retouching, said color component retains the value reached given the maximum density and the other color components increase up to their maximum density.

An advantageous further development consists therein that the pairs of locus coordinates of the marked points are deposited listwise in the sequence of their identification, and that the pairs of locus coordinates are called in in the reversed sequence, the corresponding retouch factors are changed in the retouch memory, and the retouch which ensued during the preceding contactings of the points is reversed true to the contours.

In a preferred manner, the entire retouching can be reversed by cancelling the retouch memory.

The marking device can simultaneously cover a plurality of image points lying within a retouch surface (area of the retouch brush), whereby the plurality of image points simultaneously retouched is increased in an advantageous manner.

It is further provided that the retouch factor determined from a pair of locus coordinates is only changed when a new pair of locus coordinates identified with the marking device differs from a previously identified pair of locus coordinates by a minimal amount in X and Y direction, whereby the minimum amount determines the expanse of the retouch surface.

A further improvement consists therein that the simultaneously retouched image points are displayed by means of an enlarged light mark. Another improvement provides that the image area to be retouched be limited by means of an electonically generated mask.

A preferred arrangement for implementing the method consists of a color generator (38) for forming the color increments ($\Delta Y$, $\Delta M$, $\Delta C$, $\Delta K$), of a retouch generator (39) for forming the retouch factors (r) of the image points of the color image to be retouched, of a correction value generator (40) connected to the color generator (38) and to the retouch generator (39) for forming the correction values ($Y_R$, $M_R$, $C_R$, $K_R$) from the color increments and the retouch factors, and of a respective combinatorial stage (15, 16, 17, 18) post-connected to the image repetition memory (7) in the color channels for the change of the color values by the correction values.

In a preferred embodiment, it is provided that the retouch generator (39) consists of a coordinate identification device (50, 51, 52) for determining the locus coordinates of the image points to be retouched, of an evaluation circuit (48) connected to the coordinate identification device (50, 51, 52) for forming the retouch factors for each pair of identified locus coordinates, and of a retouch memory (49) connected to the evaluation circuit (48).

In an advantageous manner, the correction value generator (40) consists of multiplication stages.

It is further provided that an input stage (37) is connected to the color generator (38) for specifying color components.

Preferably, the color generator (38) is connected to a device (8, 21, 32, 35) for color measurement in the displayed color image.

BRIEF DESCRIPTION OF THE DRAWINGS

In the following, the invention is described in greater detail on the basis of FIGS. 1 through 14. These are shown:

FIGS. 3a, b, c: graphic illustrations for determining the retouch factors;

FIG. 4: a retouch surface identified with the coordinate pin;

DESCRIPTION OF THE PREFERRED EMBODIMENTS

Figure 1:
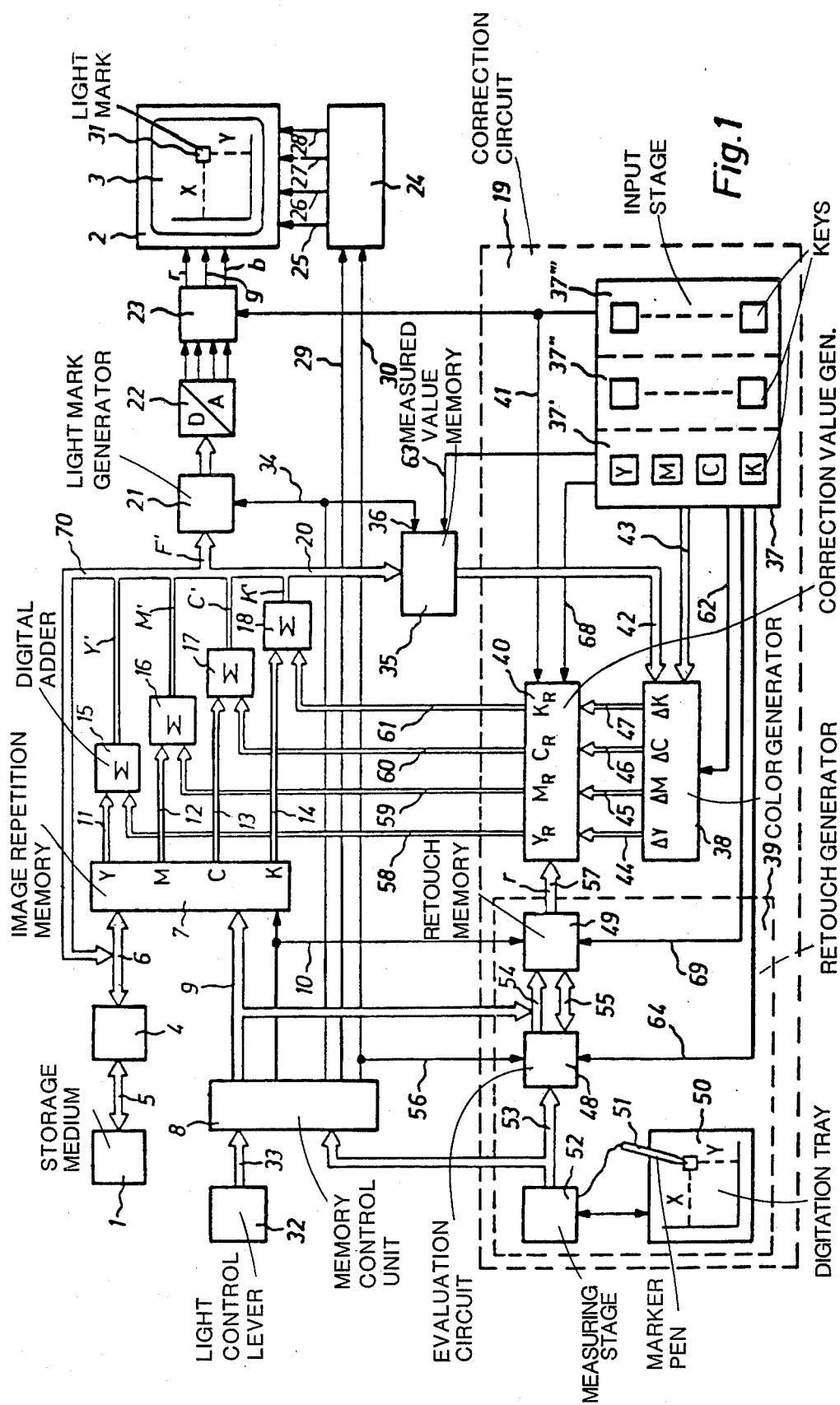
FIG. 1: a circuit arrangement for partial electronic retouching in color image reproduction.
Figure 2:
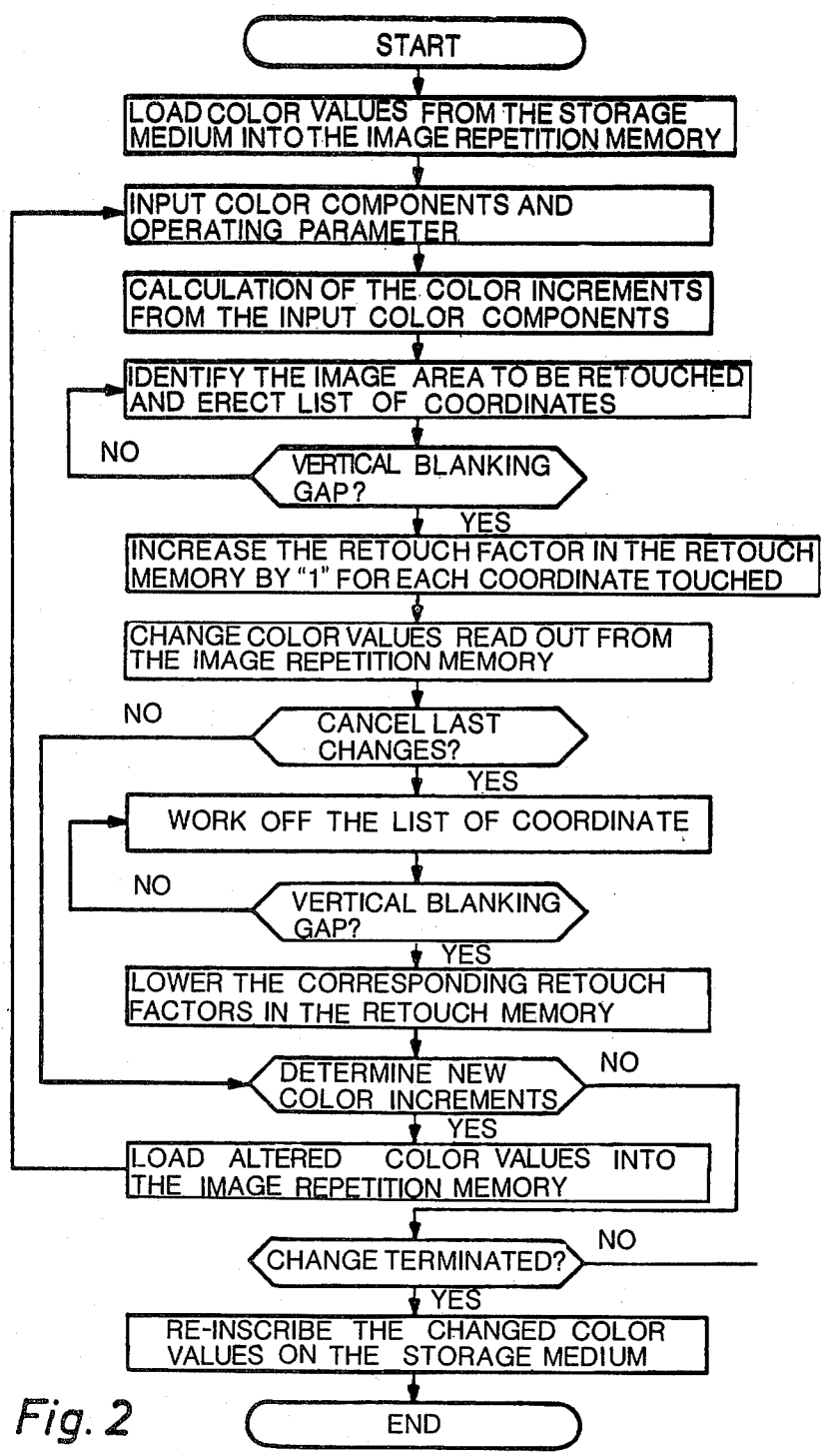
FIG. 2: a flow chart relating to the manner of functioning of the device.

FIG. 1 shows the basic format of a circuit arrangement for partial electronic retouching (retouch station) in electronic color image reproduction and FIG. 2 shows an appertaining flow chart.

A storage medium 1 (magnetic tape; magnetic disc) in the sample embodiment contains the digital color values for the color separations "yellow" (Y), "magenta" (M), "Cyan" (C) and "black" (K) of an image to be reproduced, said color values having already been corrected in a color scanner. Let the color values have, for example, a word length of eight bits, whereby 254 grey steps are distinguished between "black" (0) and "white" (255).

The image to be reproduced can be both a single image as well as an assembled printing page. The color values of a single image were previously gained in a color scanner by means of point and line-wise trichromatic scanning of a master, by means of color correction, and analog-to-digital conversion of the color separation signals. The color values of an entire printing page arose, for example, in a device for electronic page assemblage according to the GBLP No. 14 07 487 (German OS No. 21 61 038) by means of combination of the corrected single image color values according to a layout plan. Uncorrected color values, however, can also be deposited in the storage medium 1.

Before the recording of the color separations on film material by means of a color scanner (offset printing) or before the production of the printing forms by means of a graving machine (rotogravure), the images or, respectively, color values to be reproduced are to be subjected to a partial electronic retouching with visual control in order to optimize the color correction undertaken in the color scanner and/or in order to take subsequent requests for change on the part of the client into consideration.

A color monitor 2 is present for the visual control, and an image consisting of 512×512 image points can be recorded on its picture screen 3. The color values required for the display of the image to be reproduced or of a corresponding trimmed image are selected or calculated by a process control computer 4 from the overall data set of the storage medium 1 and are transmitted from there image point by image point into an image repetition memory 7 via the data busses 5 and 6. Accordingly, the image repetition memory 7 exhibits a capacity of 512×512 memory locations of 8 bit each for each color separation.

Figure 9:
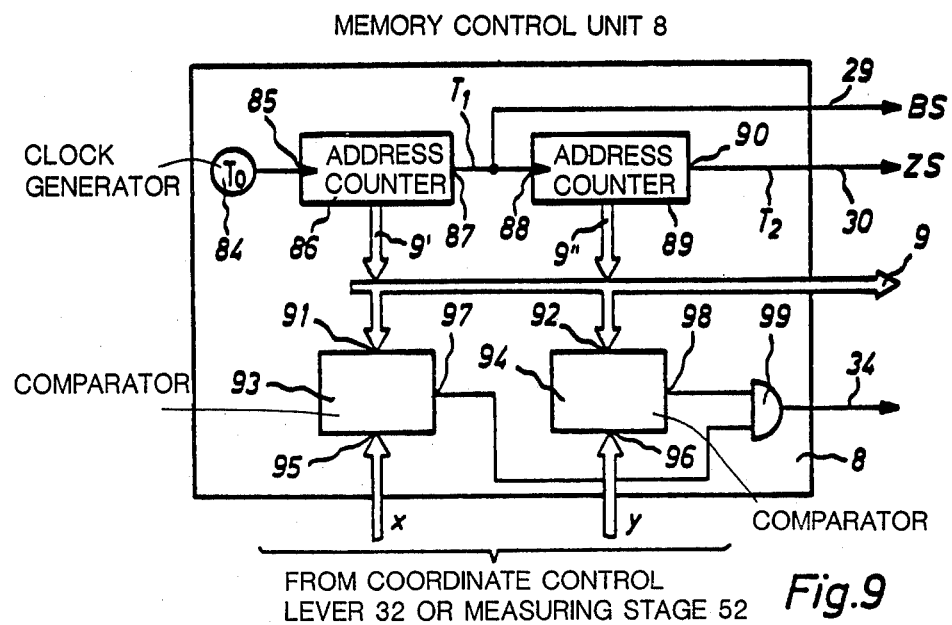
FIG. 9: a sample embodiment of a memory control unit.

In order to produce a still picture on the picture screen 3 of the color monitor 2, a memory control unit 8 cyclically callsin the X/Y addresses of the image repetition memory 7 via an address bus 9. FIG. 9 shows a sample embodiment of a memory control unit.

The stored, digital color values F [Y,M,C,K] are read out with a read clock onto a line 10 line-by-line and, within each line, image point-by-image point and are forwarded via data lines 11, 12, 13 and 14 to digital combining stages 15, 16, 17 and 18 which are designed in the sample embodiment as digital adder stages.

In the digital adder stages 15, 16, 17 and 18 which, for example, are executed as two's complement adders, digital correction values $F_R[Y_R, M_R, C_R, K_R]$ are added to (positive retouching) or are subtracted from (negative retouching) the read-out digital color values F in accord with the desired retouching in order to obtain the retouched, digital color values $F'[Y', M', C', K']$.

The correction values $F_R$ encumbered with an operational sign are generated in a correction circuit 19. Alternatively, the operational signs could be omitted and, instead, corresponding control signals which switch the adder stages to addition or subtraction could be generated in the correction circuit 19.

The retouched digital color values F' arrive via a data bus 20 and a light mark generator 21 to a digital-to-analog converter 22 and are converted there into four analog color separation signals. A post-connected printing simulation computer 23 shapes the four color separation signals, upon consideration of the parameters of the later multi-color printing, in such manner into the three drive signals r, g and b for the color monitor 2 that the display on the picture screen 3 conveys the same color impression as the multi-color printing itself. Such a printing simulation computer is extensively described, for example, in the GBLP No. 15 40 525 (German OS No. 26 07 623).

The recording ensues according to line-jump scanning in order to obtain a flicker-free image. In accord with technology standard in television, a clock generator 24 generates the horizontal and vertical deflection signals (H; V) required for image recording on lines 25 and 26 and the line start pulses (ZS) and the image start pulses (BS) on lines 27 and 28. The memory control unit 8 supplies horizontal and vertical synchronizing pulses via lines 29 and 30 to the clock generator 24, so that the image recording is synchronized with the read operation out of the image repetition memory 7.

For marking an image point or an image point area in the displayed color image, a light mark 31 is mixed into the picture screen 3 and said light mark 31 can be displaced by means of prescribing X-Y coordinates by means of a mechanical coordinate control lever 32 via an address line 33. The prescribed coordinates (addresses) are compared to the continuously called-in addresses in the memory control unit 8 and, given equality, a command "light mark" is generated on a line 34, appearing precisely at that point in time in which the electron beams of the color monitor 2 sweep over the selected image point or image point area on the surface of the picture screen. The command "light mark" activates the light mark generator 21 which briefly generates identical r, g, b drive signals for the color monitor 2. By so doing, the electron beam generating systems of the color monitor 2 are simultaneously switched on with the same luminance and the "white" light mark 31 is generated. A measuring area whose appertaining color values are to be determined can be defined on the picture screen 3 within a color with the assistance of the light mark 31. To that end, a measured value memory 35 whose write input 36 is likewise charged with the command "light mark" on the line 34 is connected to the data bus 20. In this manner, the retouched color values F' or, in case the correction values $F_R$ are made equal to zero, the unretouched color values F read out from the image repetition memory 7 which appear simultaneously with the light mark 31 on the data bus 20 can be inscribed in the measured value memory 35.

In the following, the correction circuit 19 is to be described, said correction circuit essentially consisting of an input stage 37, of a color generator 38, of a retouch generator 39, and a correction value generator 40.

For each image point with the coordinates x and y, the locationally dependent correction value $F_R(x, y)$ is composed of a locationally independent color increment $\pm \Delta F[\pm \Delta Y; \pm \Delta M; \pm \Delta C; \pm \Delta K]$ and a locationally dependent retouch factor $r(x, y)$ shared by all color separation according to the equation $$F_R(x,y) = \pm \Delta F \cdot r(x,y) \quad (1).$$

Accordingly, the following equations derive for the individual color separations:

$$\begin{aligned} Y_R(x, y) &= \pm \Delta Y \cdot r(x, y) \\ M_R(x, y) &= \pm \Delta M \cdot r(x, y) \\ C_R(x, y) &= \pm \Delta C \cdot r(x, y) \\ K_R(x, y) &= \pm \Delta K \cdot r(x, y) \end{aligned} \quad (2)$$

The color increments $\Delta F$ represent the respectively smallest correction values $F_R$ to be added or to be subtracted for the color values of the image points and are gained in the color generator 38.

The retouch factor r of an image point is the multiplier with which the appertaining color increment $\Delta F$ is to be multiplied in order to obtain the correction value $F_R$ for said image point. The retouch factor r is generated in the retouch generator 39.

The individual components of the correction circuit 19 are now to be described in greater detail.

INPUT STAGE 37

The input stage 37 exhibits three banks of keys 37', 37" and 37'''. Four color separation keys "Y", "M", "C" and "K" with which, given a separation retouching, the color separation to be retouched can be selected are provided in the bank of keys 37'. A command "color separation" on a line 41 sees to it that only the appertaining correction value $Y_R$ or, respectively, $M_R, C_R$, or $K_R$ is through-connected by the correction value generator 40 to the adder stage.

In the case of separation retouching, the selected color separation is displayed in black/white on the picture screen 3 of the color monitor 2 for visual control. A change-over which is not illustrated and which is activated by the command "color separation" on the line 41 is situated in the printing simulation computer 23. The change-over simultaneously applies the appertaining color separation signals to all color channels or to the black channel. Thereby, it is seen to that the three drive signals for the color monitor 2 are of equal size in terms of amount.

The display of the color separation to be retouched can also ensue on a black/white monitor. If the results of the retouching are to be evaluated at all color separations simultaneously, a plurality of monitors can also be employed. Now as before, the color image can be additionally displayed on a color monitor in order to observe the influence of the individual separation retouchings on the overall image. If none of the color separation keys is pressed, four correction values $F_R$ for a color retouching are automatically effective.

A ten-key keyboard with which the corresponding color components of a color f can be input in terms of value is disposed in the bank of keys 37". The bank of keys 37''' exhibits a multitude of operating keys with which various functions of the correction circuit 19 can be activated, which shall be described in greater detail below.

COLOR GENERATOR 38

The four color increments F from a target color f' (retouch color) or from the difference between an initial color f and a target color f' are determined in the color generator 38. The initial color f is that color in the image to be retouched from which the retouch is to proceed. The color components of the initial color f are determined by means of an already mentioned color measurement in the displayed color image with the assistance of the measured value memory 35 and are forwarded to the color generator 38 via a data bus 42.

The target color f' is that color which is to be achieved in the retouch. The color components of the desired target color f' can be input into the color generator 38 by means of the color separation keys of the bank of keys 37' and the ten-key keyboard of the bank of keys 37" via a further data bus 43 or, on the other hand, can be determined by means of a color measurement in the color image.

The color increments $\pm \Delta F(+ \triangleq$ positive retouching; $- \triangleq$ negative retouching) calculated in the color generator 38 with the proper operational sign are forwarded to the correction value generator 40 via data lines 44 through 47. The determination of the color increments $\pm \Delta F$ shall be explained later on the basis of a few examples. A micro-computer can be employed as the color generator 38.

RETOUCH GENERATOR 39

The retouch generator 39 comprises a coordinate identification device for the coordinates (x, y) of the image points to be retouched, further comprises an evaluation circuit 48 for calculating the locationally dependent retouch factors r(x, y) and a retouch memory 49. In the sample embodiment, the coordinate identification device consists of a digitization tray 50, of a manually guided coordinate pen 51 or some other type of marking device, and of a measuring stage 52 for the determination of the coordinate of the points contacted by the coordinate pin 51 on the digitization tray 50.

Such coordinate identification devices are commercially available (for example, Summagraphics Company, 35 Brentwood Avenue, Fairfield, U.S.A.) and are known to one skilled in the art, so that a detailed description is unnecessary.

However, any other type of coordinate identification device (for example, coordinate lever; rolling ball, etc.,) or, in case a low degree of precision is admissible, a traditional light pen can also be employed.

Given the coordinate identification device of the sample embodiment, the coordinates of the image points are determined with a resolution which is significantly higher than the resolution of the stored and displayed image consisting of 512×512 image points, whereby a high degree of precision can be attained. The coordinates measured in the coordinate identification device are converted in the measuring stage 52 to the possible 512×512 coordinates (=addresses) of the image points and are output via an address bus 53.

For the control of the retouching, the motion of the light point 31 on the picture screen 3 is synchronized with the motion of the coordinate pen 51 on the digitization tray 50. To that end, the coordinates or, respectively addresses measured in the coordinate identification device are communicated via the address bus 53 to the memory control unit 8 and are compared there with the cyclically called-in addresses of the image repetition memory 7. Given identity of address, the command "light mark" again arises on the line 34 and the light mark generator 21, as already described, generates the moveable light mark 31 on the picture screen 3.

In order to determine the retouch factors r(x, y) for each image point with the coordinates x and y to be retouched, the coordinate pen 51 is inventively employed by the operator as a "retouch brush" and, in lines lying next to one another, is repeatedly conducted across that area of the digitization tray 50 which corresponds to the image area to be retouched, whereby, in the sample embodiment selected, the plurality of sweeps per image point is a measure for the desired amount of retouching in said image point.

The coordinates x and y of the points contacted or traversed by the coordinate pen 51 are continuously forwarded via the address bus 53 to the evaluation circuit 48 and are retained in a working memory there in terms of a list. The capacity of the working memory is so great that, for example, the pairs of coordinates of the last 100 or 200 contacting points can be deposited. The evaluation circuit 48 can, for example, by a micro-computer.

In order to illustrate the determination of the retouch factors, FIG. 3a shows a section of the digitization tray 50. Beginning at a specific point in time which, for example, is characterized by the blanking gap of the image recording, let the coordinate pen 51 have executed a back and forth motion from point $P_1(2, 3)$ over the point $P_4(6, 1)$ back to the point $P_7(2, 3)$. The points P respectively mark the point in time of a coordinate identification in the measuring stage 52.

FIG. 3b shows the list of the contacted pairs of coordinates in the sequence of the contactings. Let the end of a blanking gap be marked by an arrow A and the beginning of the succeeding blanking gap be marked by an arrow B.

The determined retouch factors are over-written in the blanking gap into the retouch memory 49. To that end, FIG. 3c shows the appertaining section of the retouch memory 49 with a momentary, location-wise distribution of the identified retouch factors r before the blanking gap A.

At the beginning of the blanking gap of the image recording marked by the arrow B, the first pair of coordinates (2, 3) in the list is called in and the appertaining address (2, 3) of the retouch memory 49 is selected via an address bus 54. The retouch factor r stored under said address is read out via a data bus 55, is increased by a specific amount, for example, by "1" (intensification of the retouching) or is reduced by "1" (reversal of the retouching) and is again re-inscribed in the retouch memory 49 via the data bus 55. In the example selected, an intensification of the retouching is assumed, so that the corresponding retouch factor "15" is increased by "1" to "16" and is re-inscribed.

Then, the following pairs of coordinates in the list are called in in succession and the described features are analogously executed. After the retouch factors have been over-written into the retouch memory 49, the working memory of the evaluation circuit 48 is erased.

In accord with the assumed 512×512 image points of the color image, the overall retouch memory 49 has a capacity of 512×512×8 bits, so that 255 contactings of the coordinate pen 51 can be counted and stored per image point (pair of coordinates).

The blanking gap of the image recording is signalled to the evaluation circuit 48 by the memory control unit 8 via a line 56. During the frame blanking, the read-out of the retouch factors r from the retouch memory 49 is interrupted. The manner of overwriting has the advantage that retouch changes already become visible in the new image without the image display itself being disturbed by the retouch operation.

The addresses of the image repetition memory 7 and of the retouch memory 49 are cyclically and synchronously called in via the common address bus 9, whereby locationally allocated digital color values F and retouch factors r are simultaneously read out.

In that the coordinate pen 51 is employed by the operator in accord with the inventive idea both for coordinate identification as well as for determining the change amounts, any desired, gradual changes and color bleedings can be achieved in an advantageous manner in the manner of conventional brush retouching. Since the manual guidance of the coordinate pen corresponds to that of the traditional retouching brush, the retoucher, who is used to working with the retouch brush, can execute the inventive, electronic retouching without a re-training process.

In order for the operator to determine an image location to be retouched, it is not necessary to stretch a master coinciding with the final format, a lay-out plan or a sample impression onto the digitization tray 50 with proper fit, since the desired image location is displayed to the operator by means of the synchronized light mark 31 on the picture screen 3. By so doing, the production of a master coinciding in its final format or of a sample impression can be omitted in an advantageous manner.

In order to further facilitate the work, the displayed image could be projected onto the digitization tray. It would likewise be conceivable to employ a transparent digitization tray and to dispose the color monitor 2 under the digitization tray.

Figure 11:
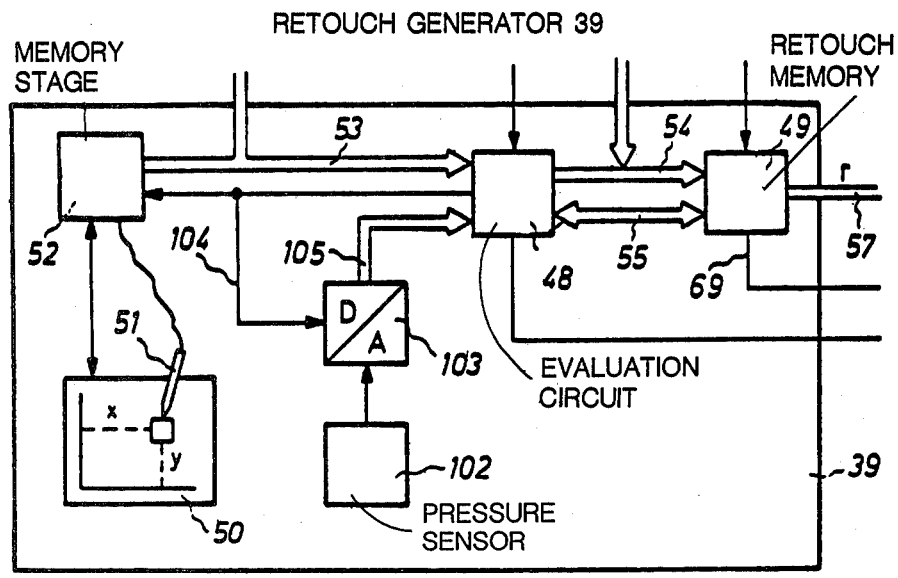
FIG. 11: a sample embodiment of a retouch generator.

In an advantageous manner, the retouch factors can also be determined proceeding from the mechanical pressure with which the coordinate pen 51 is pressed against the digitization tray 50. FIG. 11 shows a sample embodiment of the retouch generator 39.

Figure 12:
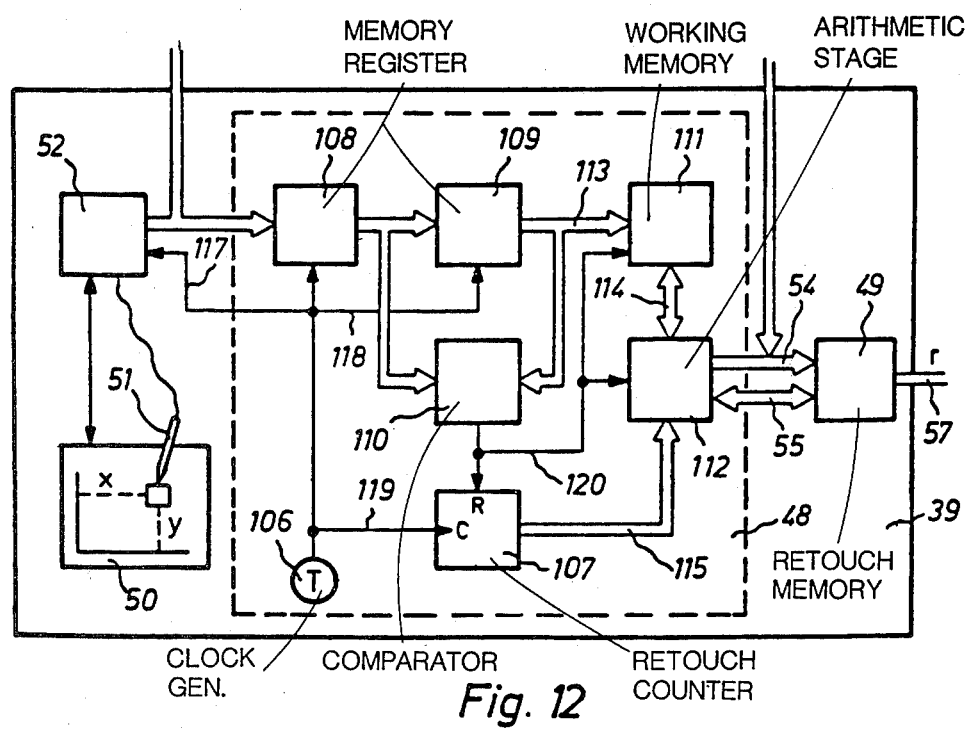
FIG. 12: a further sample embodiment of a retouch generator.

Preferably, the retouch factors for the image points to be retouched can also be determined from the dwell time of the coordinate pen 51 on the corresponding points of the digitization tray 50 or, respectively, from the time duration for which a key of the input stage 37 is pressed while the coordinate pen 51 contacts the corresponding points. To that end, FIG. 12 shows a sample embodiment of the retouch generator 39.

It lies within the framework of the invention to forego the display of the color image to be retouched on the picture screen 3 of the color monitor 2 in case a master, a sample impression or the like exists. The image area to be retouched is then determined on the basis of the master stretched across the digitization tray 50 and the retouch effect achieved is monitored, for example, at a measuring instrument.

CORRECTION VALUE GENERATOR 40

The retouch factors r read out of the retouch memory 49 are forwarded via a data bus 57 to the correction value generator 40 in which they are multiplied, according to the specified equations, with the color increments F determined in the color generator 38 for the individual color separations in order to obtain the correction values $F_R$.

Figure 8:
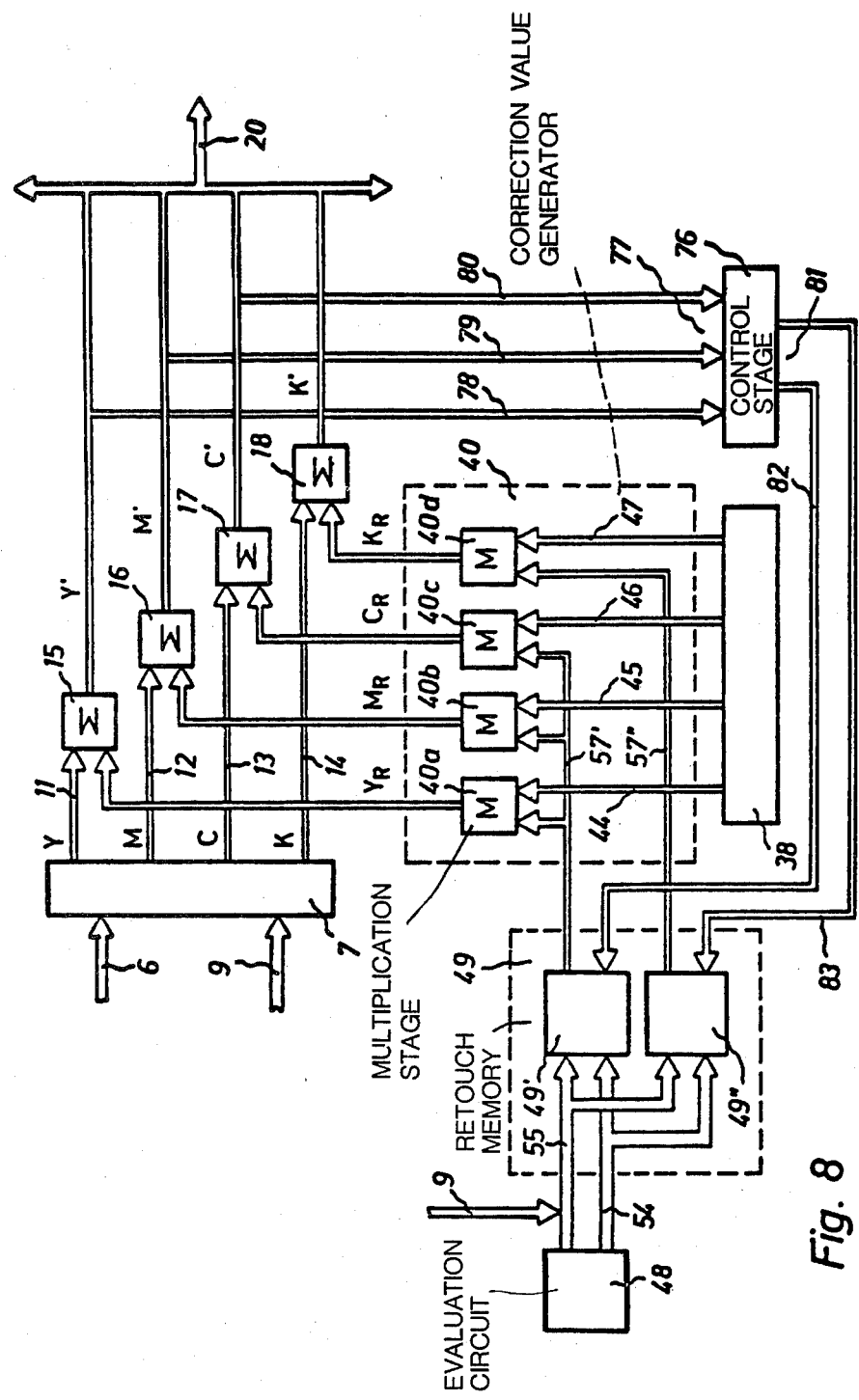
FIG. 8: a further development of the circuit arrangement.
Figure 10:
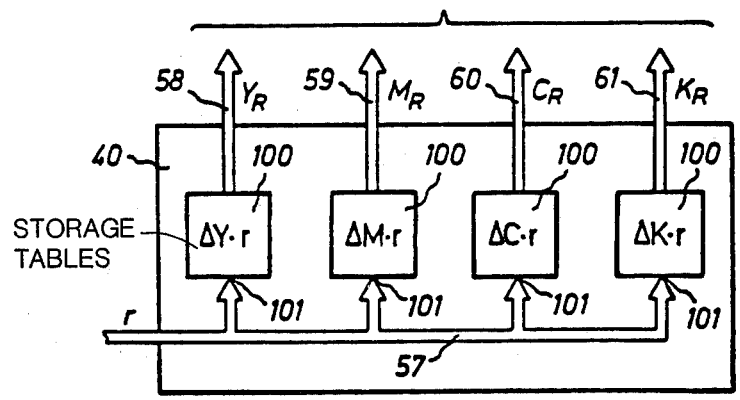
FIG. 10: a sample embodiment of a correction value generator.

In the sample embodiment, the correction value generator 40, as illustrated in FIG. 8, consists of four multipliers. The correction value generator 40, however, can also contain a table storage. FIG. 10 shows a sample embodiment with table storages.

The correction values $F_R$ calculated in the correction value generator 40 are communicated to the digital adder stages 15, 16, 17 and 18 in the individual color channels via data lines 58, 59, 60 and 61.

Expediently, the color increments F which are added or subtracted with one passage are selected so large that the density change in the colored image lies below the visible threshold. It is only the sum of the motions of the coordinate pin 51 which leads to a perceptible change of tonal value, whereby an individual motion cannot be seen. To that end, the color increments $\Delta F$ are selected smaller than the significance of the least significant bit of the digital color values F deposited in the image repetition memory 7, for example as a multiple of 1/256 of said significance. The correction values $F_R$ are rounded up or, respectively, off to whole numbers before they are supplied to the adders. This has the advantage that the retouching can be executed in very fine steps.

As already mentioned, the input stage 37 exhibits a bank of keys 37''' with a plurality of operating keys with which various functions in the arrangement can be selected before, during and after the retouching. These functions are now to be explained in detail.

POSITIVE RETOUCHING; NEGATIVE RETOUCHING

With the operating keys "positive retouching" and "negative retouching", the operator determines whether a positive retouching or a negative retouching is to be executed in the individual color channels. A corresponding control signal on a multiple line 62 sees to it that the color increments $\Delta F$ are output from the color generator 38 with the proper operational sign.

INITIAL COLOR; TARGET COLOR

With the operating keys "initial color" and "target color", the operator determines whether the color components input into the color generator 38 are to be evaluated for calculating the color increments $\Delta F$ as initial color or as target color, this being likewise signalled to the color generator 38 via the multiple line 62. If both an initial color as well as a target color are defined, the operational sign determination for the color increments $\Delta F$ (positive retouching; negative retouching) automatically ensues by means of the differential formation between the target color and the initial color, so that the corresponding operating keys need not be activated.

COLOR MEASUREMENT

In order to initiate the color measurement which has already been described, the operator presses an operating key "measure" with which the measured value memory 35 is activated via a line 63.

RESOLUTION IN TERMS OF AMOUNT

The resolution in terms of amount in the retouching can be changed by means of the size of the color increments $\Delta F$.

If the greatest correction values $F_R$ (final correction values) which must be achieved in a retouching are known, for example, from a differential color measurement between a target color and an initial color, and if said final correction values $F_R$ are achieved with N contactings, then the required color increments $\Delta F$ derive as quotients from the final correction values $F_R$ and the number "N".

The number "N" is input with the assistance of the ten-key keyboard of the bank of keys 37'' via the data bus 43 given simultaneous pressing of the operating key "retouching fineness" into the color generator 38 for the calculation of the color increments $\Delta F$, whereby a corresponding control signal is triggered on the multiple line 62.

In the sample embodiment, the greatest resolution is achieved when N=255 is selected in accord with the maximum plurality of contactings to be registered.

RESOLUTION IN TERMS OF SURFACE

The finest resolution in terms of surface which can be achieved with the coordinate identification device amounts to one image point. In order to be able to retouch greater surfaces more quickly, the plurality of the image points covered with each contacting of the coordinate pen 51 can be increased. In this case, it is not only the retouch factor r of the image point contacted with the coordinate pen 51 which is changed in the evaluation circuit 48 but, rather, the retouch factors r of the image points surrounding said image point are likewise changed, whereby the retouch surface, i.e., so to speak, the "surface of the retouch brush" is enlarged. The retouch surface, for example, can be selected rectangularly or circularly.

In order to increase the retouch surface, the operator activates an operating key "retouch surface", wherewith a control signal is forwarded to the evaluation circuit 48 via a multiple line 64. In this case, the evaluation circuit 48 only accepts new coordinates when they deviate from the most recently accepted coordinates in the X or Y direction by a minimum distance "d". The minimum distance "d" is selected in such manner that movements of the coordinate pen 51 which lie next to one another and, thus, the corresponding changes in the color image, do not overlap.

The size and shape of the retouch surface is displayed to the operator on the picture screen 2 of the color monitor 3 by means of a correspondingly shaped and enlarged light mark 31.

Figure 5:
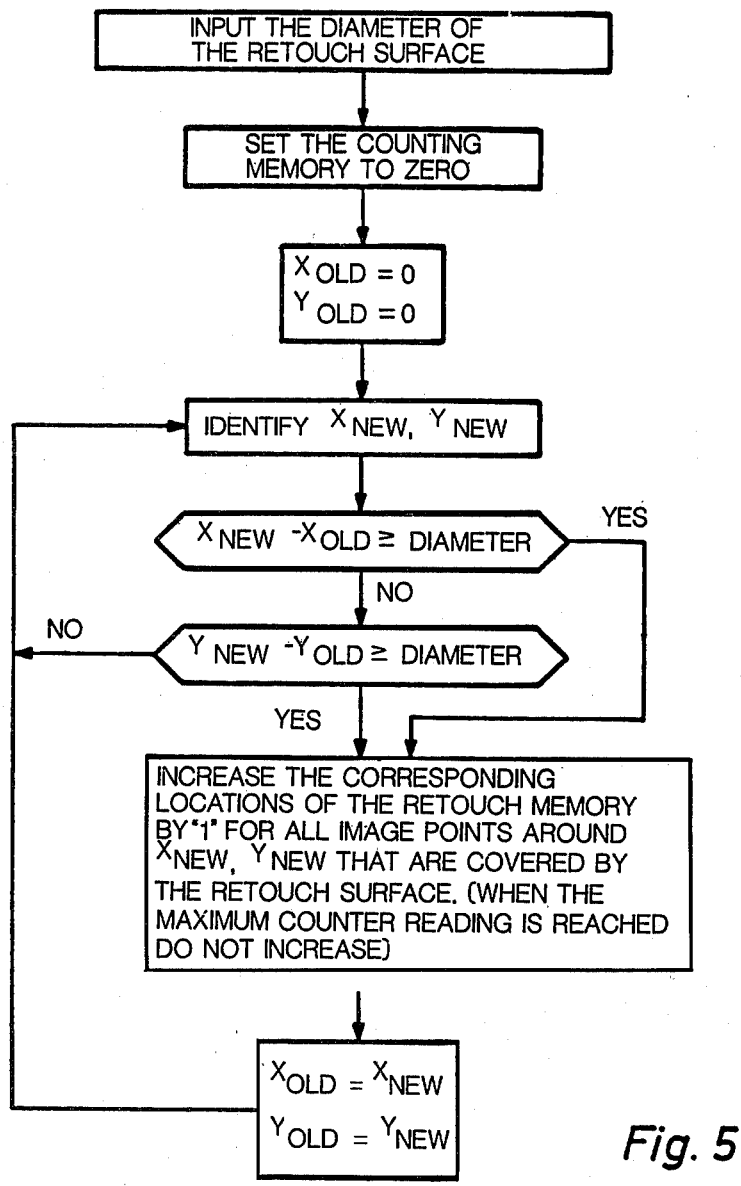
FIG. 5: a flow chart relating to the identification of coordinates.

By way of illustration, FIG. 4 shows the disposition of the respectively simultaneously retouched image points given an enlarged retouch surface 65 which, for example, consists of 3×3 image points 66. The line 67 indicates a random motion of the coordinate pen 51. The appertaining flow chart is illustrated in FIG. 5.

RETOUCH MASK

Figure 13:
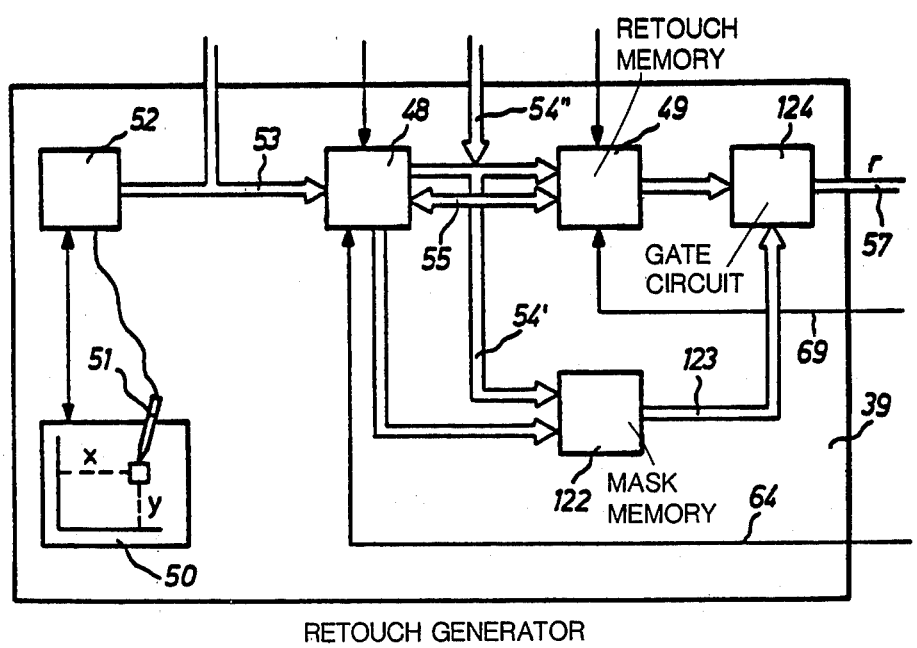
FIG. 13: a sample embodiment of the retouch generator with mask memory.

Frequently, the retouching must be limited to a sharply bounded area of the image. This is the case, for example, when images are copied into one another when the image area to be retouched is adjacent to an image which has been copied in and is to be taken over without change. As a rule, it is not possible to limit the retouch effect precisely in terms of image point to the appertaining image area by means of a precise guidance of the coordinate pen. This work is advantageously facilitated when the correction is automatically limited by means of an electronically generated retouch mask, whereby the careful encompassing of the retouch area with the coordinate pen is eliminated. FIG. 13 shows a further sample embodiment of a retouch generator with which such a retouch mask is generated.

DISPLAYING THE ORIGINAL

In order to evaluate the color image at any given stage of the retouching, it is advantageous to briefly display the un-retouched original image on the picture screen 3 of the color monitor 2. To that end, the operator presses the operating key "original" of the input stage 37. A corresponding command on a line 68 to the correction value generator 40 disconnects the correction values $F_R$ from the data lines 58 through 61, whereby the color values F of the original read out from the image repetition memory 7 are recorded free of influence from the correction values $F_R$.

REVERSAL OF THE RETOUCHING

If the retouching was too intense, it can again be reduced in that the operator first actuates an operating key "reversal" in the input stage 37 and then passes over the appertaining image location with erasing motions of the coordinate pen 51. In this case, a command on the multiple line 64 sees to it that the retouch factors r in the evaluation circuit 48 and, accordingly, in the retouch memory 49 are reduced by the required amounts.

If the cancellation of the retouch effect of one or more motions of the coordinate pen 51 is desired, the stored list of pairs of coordinates and allocated retouch factors is worked off in an expedient manner in the reverse direction in the evaluation circuit 48, whereby the retouching is retracted true to the contours without a renewed motion of the coordinate pen.

CANCELLATION OF THE RETOUCHING

The overall retouching can be cancelled in that the content of the retouch memory 49 is cancelled. To that end, the operator presses an operating key "cancel" in the input stage 37 and a corresponding command on a line 69 cancels the memory contents.

If the retouching of a partial area has been terminated or if one would like to input new initial conditions into the circuit, the retouched color values F' are previously loaded into the image repetition memory 7 via the returned data bus 70 and a new partial retouch can commence.

When, finally, the entire retouching of the color image is terminated, the retouched color values F' are reinscribed on the storage medium 1 by means of the process control computer 4.

In order to be able to explain the manner of functioning of the arrangement according to FIG. 1 in yet greater detail, a few typical retouch operations which can be executed with the retouch station are described below on the basis of graphic illustrations and flow charts. The retouch factors r are entered on the abscissa and the densities D are entered on the ordinate. The density $D_m$ corresponds to the maximum density value of, for example, 1.7 given half-tone separations or to the raster point size 100% given raster separations. The graphic illustrations respectively apply to one image point in the appertaining colors.

Figure 6A:
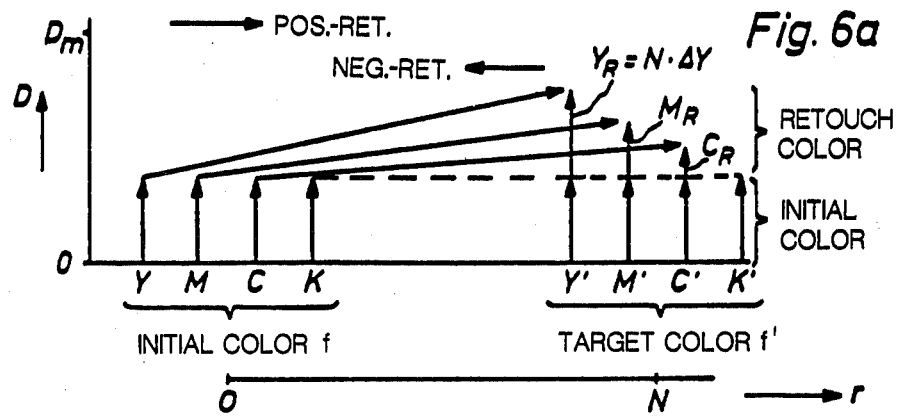
FIGS. 6a, b, c, d, e: graphic illustrations for the explanation of retouch functions.
Figure 7A:
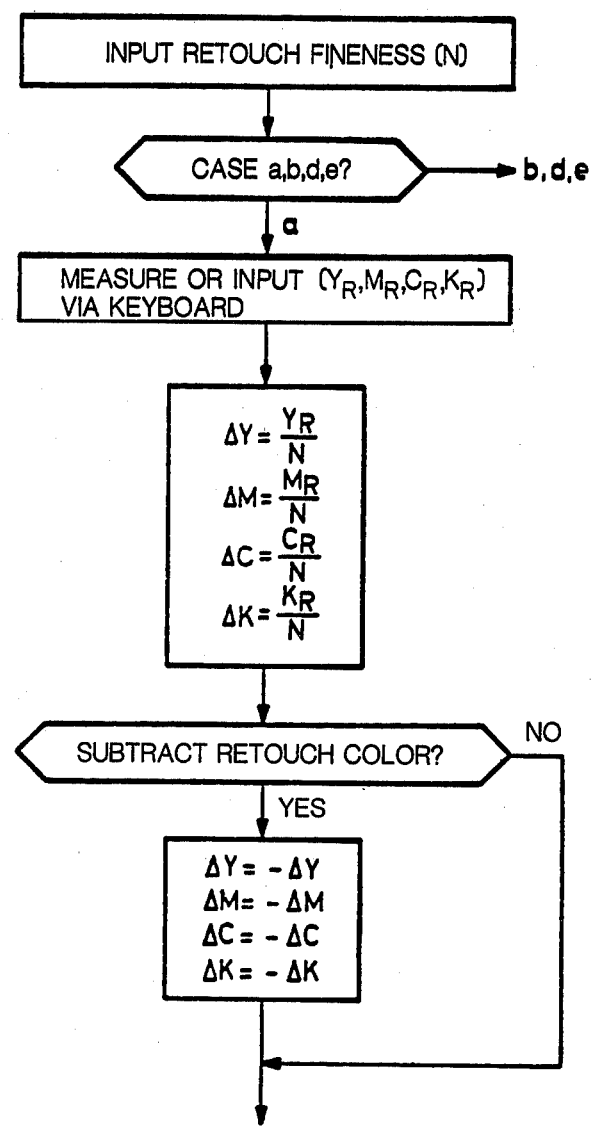
FIGS. 7a, b, d, e: flow charts relating to the explanation of the retouch functions.

(a) A first, typical retouch job is explained in the graphic illustration of FIG. 6a and in a flow chart in FIG. 7a. A specific retouch color $f_R$, for example, the retouch color "brown", with the color components $Y_R$, $M_R$, $C_R$ and $K_R$ is to be applied on an image area with a neutral initial color f (grey; white) with the color components Y, M, C and K. First, the operator will take the color components of the retouch color "brown" from a color chart and input them into the input stage 37 with the assistance of the color separation keys of the bank of keys 37' and of the ten-key keyboard of the bank of keys 37".

From the pre-selected values and the number "N", the color generator 38 determines the color increments $\Delta F[\Delta Y; \Delta M; \Delta C; \Delta K]$ in terms of proportion. Since the retouch color $f_R$ is to be applied, it is a matter of a positive retouching and the color increments $\Delta F$ have a positive operational sign.

The operator then executes the application of the retouch color $f_R$ in that, with brushing motions, he conducts the coordinate pen 51 across that part of the digitization tray 50 which corresponds to the image area to be retouched. In this manner, the corresponding correction values $F_R$ are added by image points with each contacting to the digital color values F of the initial color f until, after N contactings, the desired target color f' is reached on the picture screen 3 of the color monitor 2. Of course, the application of the retouch color $f_R$ can also be broken off before the target color f' is reached or can be partially reversed.

The retouch color $f_R$ can also be generated by means of variable density generators on the picture screen 3 of the color monitor 2. When the desired retouch color $f_R$ has been found, the appertaining color components which can be read at the density generators are input via the ten-key keyboard.

The retouch color $f_R$ to be applied, however, can also be determined by means of color measurement in the displayed color picture or in the mixed-in color fields of a color chart. The retouch color $f_R$ measured in one image area can be transferred to another image area of the color image in this manner.

Figure 6B:
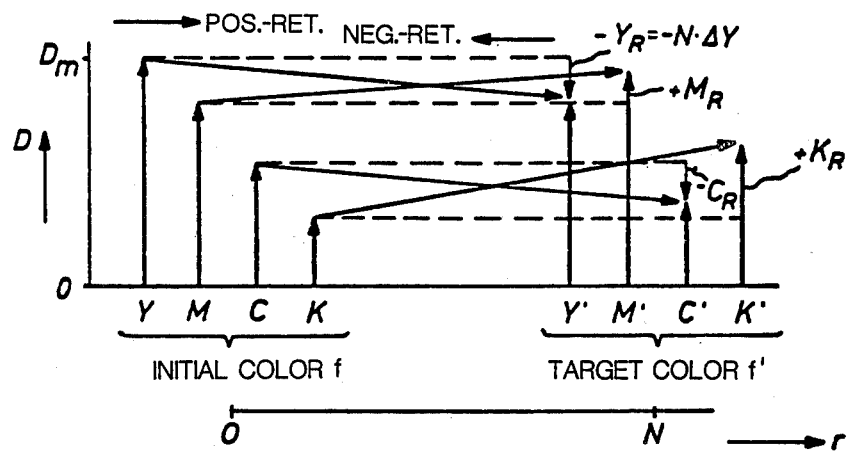
Figure 7C:
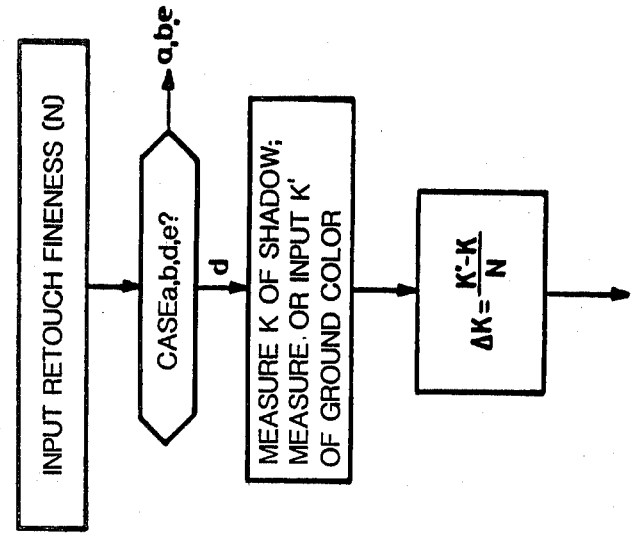
Figure 7B:
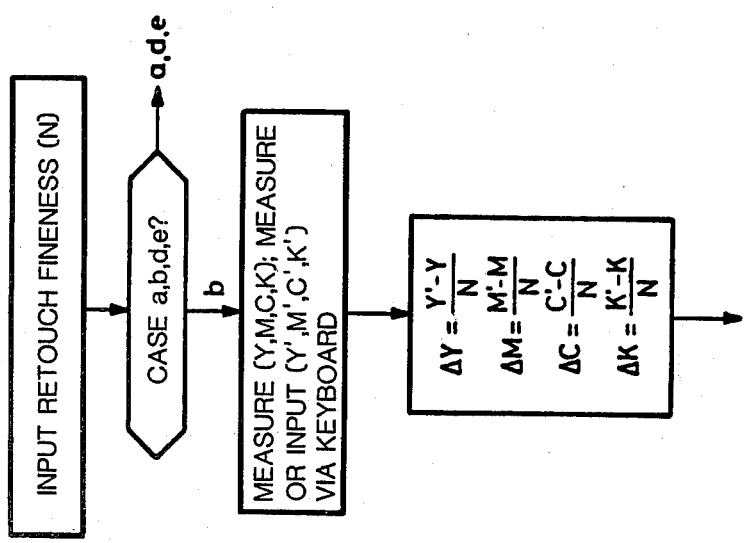

(b) Another typical retouch job is explained on the basis of the graphic illustration of FIG. 6b and of a flow chart in FIG. 7b.

A bleeding color transition is to be created from one initial color f with the color components Y, M, C and K to a target color f' with the color components Y', M', C' and K', whereby, for example, specific image details are to be gradually matched too or, finally, equalized with a surrounding color. The initial color f and the target color f' can again be determined by means of a color measurement in the displayed color image. The target color f', however, can also be input by means of the ten-key keyboard. The color increments F are again determined from the differences of the corresponding color components of the target color f' and of the initial color f and from the number and the retouching is then executed. After N sweeps with the coordinate pen 51 over the image point which previously exhibited the initial color f, said point has assumed the target color f'.

Figure 6C:
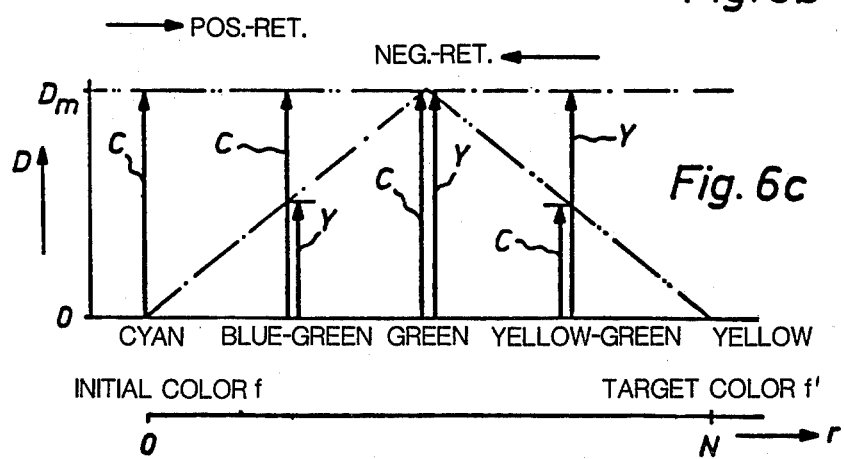

(c) Given a special case, which can be seen from the graphic illustration of FIG. 6c, initial color f and target color f' are respectively one separation color, so that only one color component is altered. When, for example, the separation color "yellow" is gradually added to the separation color "Cyan" as a retouch color, then the initial color "Cyan" is first fully retained (density $D_m$) and the subtractive, saturated mixed color "green" arises. Upon attainment of the saturated color "green" and continued retouching, the separation color "yellow" retains its maximum value and the separation color "Cyan" is reduced, so that, at the termination of the retouching, the target color "yellow" is reached.

In order to limit the color components to the density value $D_m$, limiting adders, for example, are employed which fix the adding operation to a value which corresponds to $D_m$ even when the actual result of the addition is greater.

Figure 6D:
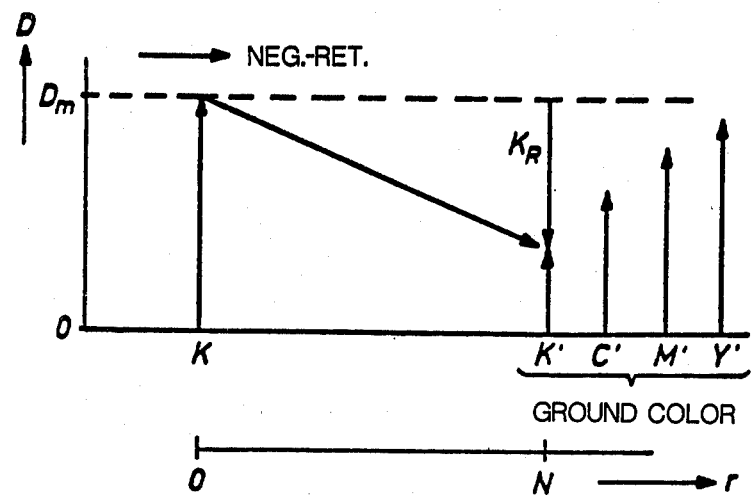

(d) Up to now, examples for a color retouching, i.e., simultaneous correction in all color separations, were described. As already mentioned, however, separation retouchings can also be executed with the arrangement according to FIG. 1. An example, which is explained on the basis of the graphic illustration in FIG. 6d and of the flow chart of FIG. 7c, is the retouching of shadow passages (black component K). A part of a shadow passage is to be removed and replaced by ground color f' with the color components Y', M', C' and K' (for example, brown).

To that end, the operator actuates the color separation key "K" of the bank of keys 37', whereby the corrections are only executed in the color values of the black separation, and actuates the operating key "negative retouching" of the bank of keys 37'''.

By means of the retouching, the black component K of the shadow is then reduced by the correction value $K_R$ to the black component K' of the ground color f' (brown). The final value derives by means of an optical comparison with the ground color present in the color image.

Figure 6E:
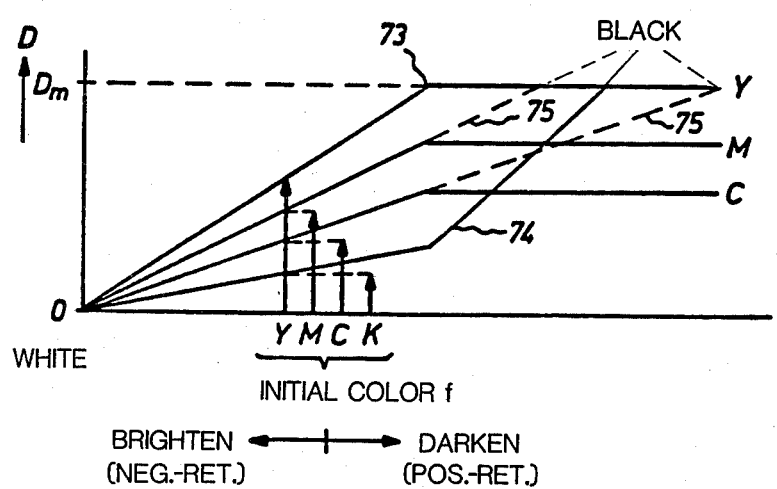
Figure 7D:
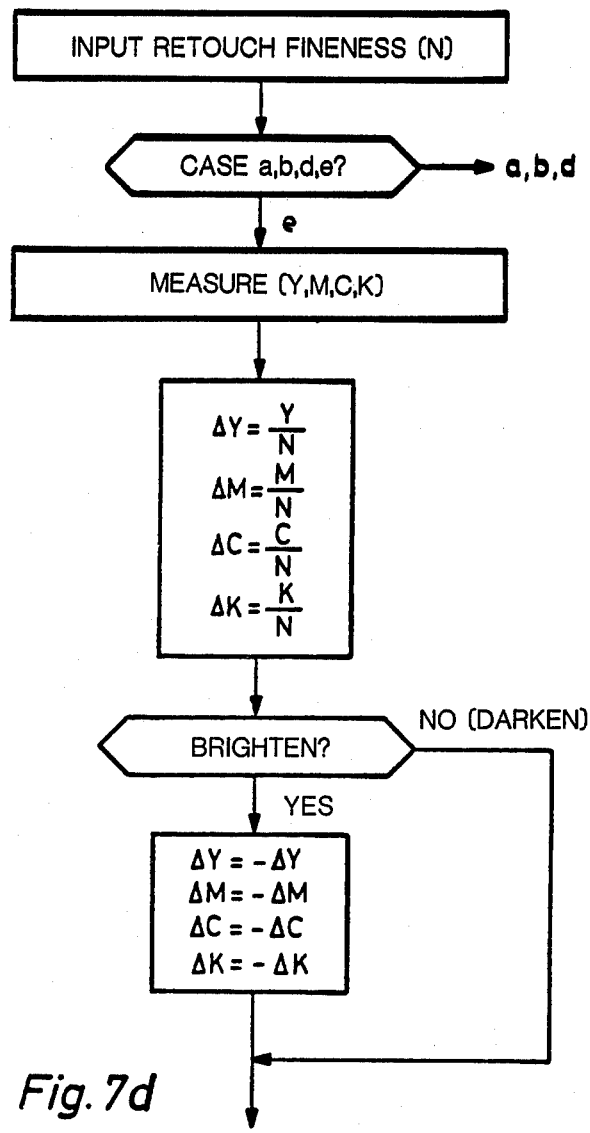

(e) A further, typical retouch job is brightening and darkening, this being described on the basis of the graphic illustration of FIG. 6e and of the flow chart of FIG. 7d.

A color f with the color components Y, M, C and K can be brightened by means of the subtraction (negative retouching) of correction values $Y_R$, $M_R$, $C_R$ and $K_R$ to the final point "white" or can be further saturated by means of the addition (positive retouching) of corresponding correction values $F_R$—in case the color is not already saturated—and can be darkened up to the final point "black".

In darkening with the coordinate pen 51, the color components of the initial color f first increase percentally until the greatest color component of the initial color f, for example, Y, has reached the highest saturation (density $D_m$) in the point 73, which may be the case given a retouch factor r*. Given a continuation of positive retouching, the color components Y, M and C are limited to the values which they reached given the retouch factor r* and only the black component K increases with an altered color increment $\Delta K^*$ until the final point "black" (line 74). In case the initial color f exhibits no black component (tri-color printing), only the greatest color component of the initial color f which first reaches saturation is limited to the density value $D_m$ and the other color components, given continued retouching, continue to increase until they have also reached the density value $D_m$ (line 75); therewith, the initial color f has been darkened to "black".

FIG. 8 shows an advantageous further development of the circuit arrangement according to FIG. 1 with which, in particular, the brightening and darkening described in FIG. 6e and FIG. 7d can be implemented. Only those parts which are important for comprehension have been incorporated from FIG. 1.

In the arrangement, the retouch memory 49 exhibits two memory units 49' and 49" of 512×512×8 bit each which are connected in common to the data bus 54 and the address bus 55 of the evaluation circuit 48. In addition, a control stage 76 is provided whose inputs 77 are connected via data lines 78, 79 and 80 to the outputs of the adder stages 15, 16 and 17 in the color channels "yellow", "magenta" and "Cyan". The outputs 81 of the control stage 76 are connected to the memory units 49' and 49" via corresponding control busses 82 and 83. The instantaneous values of the retouched color components Y', M' and C' are reported via the data lines 78, 79 and 80 to the control stage 76 and are compared there to a threshold value which corresponds to the density value $D_m$.

The correction value generator 40 consists, for example, of the multiplication stages 40a, 40b, 40c and 40d which are charged on the data lines 44, 45, 46 and 47 with the color increments $\Delta Y$, $\Delta M$, $\Delta C$ and $\Delta K$ calculated in the color generator 38. Moreover, the multiplication stages 40a, 40b and 40c which are allocated to the color channels "yellow", "Magenta" and "Cyan" are connected via a data bus 57' to the memory unit 49' and the multiplication stage 40d allocated to the color channel "black" is connected via a further data bus 57" to the memory unit 49". The retouch factors of the chromatic color components are deposited in the memory unit 49' and the retouch factor for the black component is deposited in the memory unit 49", so that a varying evaluation can ensue, since the saturation of the individual image points occurs at different times and given a different plurality of contactings.

During the retouching, the retouch factors r determined in the evaluation circuit 48 are first inscribed in parallel to both memory units 49' and 49". As soon as one of the color components Y, M and C in an image point reaches the density value $D_m$, this is perceived in the control stage 76. Via the control bus 82, the control stage 76 places, for example, the MSB of the retouch factor r* allocated to the image point in the memory unit 49', wherewith the color saturation in the image point is marked and the corresponding retouch factor $r_K$ in the memory unit 49" is not changed. Given a renewed contacting of the same image point, the "saturation" is perceived by the MSB and the appertaining retouch factor is not increased any further, so that the color components Y, M and C of the image point, despite the continued motion of the coordinate pen 51, remain constant. In contrast thereto, for darkening, the retouch factor $r_K$ of the image point continues to be increased and the black component is increased up to the final point "black".

FIG. 9 shows a sample embodiment of the memory control unit 8 in FIG. 1.

The memory control unit 8 contains a clock generator 84 which counts a counting clock sequence $T_0$ into a X address counter 86 via a counting input 85. The X address counter 86 is a nine-bit binary counter and calls up the X addresses of the image repetition memory 7 from 0 through 511 via an address bus 9'. After respectively 511 counted clocks, a clock $T_1$ appears at the output 87 of the X address counter 86, said clock $T_1$ being counted into a Y address counter 89 via a counting input 88. The Y address counter 89 is likewise a 9-bit binary counter and calls up the corresponding Y addresses of the image repetition memory 7 from 0 through 511 via an address bus 9". The address busses 9' and 9" are united to form the address bus 9 which is connected to the image repetition memory 7. The Y address counter 89, after 511 clocks counted in, likewise generates a clock $T_2$ at its output. The line start pulses (ZS) and the image start pulses (BS) are derived on the lines 29 and 30 for the image recording from the clocks $T_1$ and $T_2$.

The address busses 9' and 9" are respectively connected to the first comparison inputs 91 and 92 of the comparators 93 and 94. The second comparison inputs 95 and 96 of the comparators 93 and 94 are charged with the X/Y coordinates which can be prescribed by means of the coordinate control lever 32 for the displacement of the light mark or which can be generated by the measuring stage 52 for the synchronization of the light mark 33 with the motion of the coordinate pen 51. The signal outputs 97 and 98 of the comparators 93 and 94 are linked to one another via a AND gate 99. Given equality of the addresses, the signal "light mark" appears on the line 34.

FIG. 10 shows a further sample embodiment of the correction value generator 40. The product formation consisting of the retouch factors r and the color increments $\Delta F$ ensues with the assistance of four table storages 100 with respectively 256 memory locations of 8 bit word length each. In this case, the correction values $F_R = \pm \Delta F \cdot r$ are calculated for all possible retouch factors r before the retouching and are deposited in the table storages 100, whereby negative retouch values are described as two's complement numbers. During the retouching, the retouch factors r read out of the retouch memory 49 via the data bus 57 are applied to the address inputs 101 of the table storages 100, the appertaining correction values $F_R$ are read out and are supplied to the adder stages 15, 16, 17 and 18 via the lines 58, 59, 60 and 61.

FIG. 11 shows a sample embodiment of the retouch generator 39 for that case in which the retouch factors are determined from the mechanical pressure with which the retoucher presses the coordinate pen 51 against the digitizer tray 50. To that end, a pressure sensor 102 which converts the exerted pressure into a measured voltage is built into the coordinate pen 51.

Such pressure sensors are commercially available. For example, a pressure sensor of the type KPY 13 of the Siemens Company can be employed.

Alternately, the retouch factors, however, can be calculated from the mechanical pressure with which a key is depressed, said key containing a corresponding pressure sensor.

An analog-to-digital converter 103 is post-connected to the pressure sensor 102, said analog-to-digital converter converting the measured voltage into digital voltage values p. The measuring stage 52 and the analog-to-digital converter 103 are synchronized via a line 104 by a synchronization clock generated in the evaluation circuit 48. With the synchronization clock, the identified coordinate pairs x, y are continuously over-written from the measuring stage 52 via the address bus 53 into the evaluation circuit 48 and the appertaining, digital voltage values p (x, y) are overwritten from the analog-to-digital converter 103 via a data bus 105 into the evaluation circuit 48 and are retained in the working memory there in the form of a list.

A section of said list, for example, has the following appearance:

$x_1, y_1 \quad p_1$
$\quad \overleftarrow{\quad} A$
$x_1, y_1 \triangleq p_1$
$x_2, y_2 \triangleq p_2$ -continued $x_3, y_3 \triangleq p_3$
$x_1, y_1 \triangleq p_4$
$\quad \overleftarrow{\quad} B$
$x_4, y_4 \triangleq p_5$ As in FIG. 3c the arrows A and B again identify the blanking gap of the image recording in which the retouch factors are determined and are over-written into the retouch memories 49. If a pair of coordinates occurs only once between two blanking gaps, then the appertaining retouch factor is equal to the pressure value measured for said pair of coordinates. If, in contrast thereto, a pair of coordinates occurs severally, the retouch factor of the pair of coordinates corresponds to the sum of pressure values measured in succession for said pair of coordinates. In the example, $r(x_1,y_1) = p_1 + p_4$; $r(x_2,y_2) = p_2$; and $r(x_3,y_3) = p_3$ The transfer of the retouch factors into the retouch memory 49 has already been described in detail on the basis of FIG. 1.

FIG. 12 shows a further sample embodiment of the retouch generator for that case in which the retouch factors are determined from the dwell time of the coordinate pen 51 on the corresponding points of the digitization tray 50 or, respectively, are determined from the time duration over which an operating key is pressed while the coordinate pen 51 contacts the corresponding points.

The evaluation circuit 48 of the retouch generator 39 consists of a clock generator 106, of a retouch counter 107, of two memory registers 108 and 109 connected in series, of a comparator 110, of a working memory 111 and of an arithmetic stage 112. The working memory 111 is addressed by the memory register 109 via an address bus 113. The working memory 111 is connected to the arithmetic stage 112 via a data bus 114. The arithmetic stage 112, moreover, is connected to the retouch counter via a further data bus 115.

The clock sequence generated in the clock generator 106 is supplied as a read clock to the measured value stage 52 via a line 117, is supplied as a memory clock to the memory registers 108 and 109 on a line 118 and is supplied as a counting clock to the retouch counter 107 on a line 119, whereby the counting clock serves for the determination of the dwell time.

The pairs of coordinates of the contacted points are continuously read out of the measured value stage 52 with the read clock on the line 117 and are transferred into the memory registers 108 and 109 via the address bus 53 in such manner that the current pair of coordinates is respectively deposited in the memory register 108 and the preceding pair of coordinates is deposited in the memory register 109. The stored pairs of coordinates are compared to one another in the comparator 110, whereby the comparator 110, given a change of coordinates, generates a control signal on a line 120.

If the succeeding pairs of coordinates are identical, the counter reading of the retouch counter 107 is increased by "1" by means of a corresponding counting clock on the line 119 given each pair of identical coordinate pairs which are read out. Since identical coordinate pairs, however, mean that the coordinate pen 51 has been momentarily fixed at one point, the couterreading, thus, is a measure for the dwell time of the coordinate pen 51 on said point. The counter reading, thus, corresponds to the retouch factor r.

If, in contrast thereto, the comparator 110 determines that a current pair of coordinates and the preceding pair of coordinates are unequal, which is the case given motion of the coordinate pen the control signal of the comparator 110 forwards a command to the working memory 111 via the line 120. At the same time, the working memory 111 was addressed via the address bus 113 with the preceding pair of coordinates. The retouch factor already deposited under the address called up is transferred via the data bus 115 into the arithmetic stage 112. The read-out retouch factor and the retouch factor determined in the retouch counter 107 are added to or, respectively, subtracted from one another in the arithmetic stage 112 and the corrected retouch factor is again re-inscribed into the working memory 111.

The list of pair of coordinates, for example, has the following appearance:

$x_1,y_1$
$\leftarrow A$
$x_1,y_1$
$x_1,y_1$
$x_1,y_1 \quad r(x_1,y_1) = 3$ $x_2,y_2$
$x_2,y_2 \quad r(x_2,y_2) = 2$ $x_1,y_1$
$x_1,y_1 \quad r(x_1,y_1) = 2$
$\leftarrow B$
$x_1,y_1$ Thus, the retouch factors $r(x_1,y_1)=3+2=5$ and $r(X_2,y_2)=2$ derive between two blanking gaps which are again characterized by A and B.

As already explained in detail, the retouch factors are then transferred during the blanking gap from the working memory 111 via the arithmetic stage 112 into the retouch memory 49. After the transfer, the working memory 111 is erased.

FIG. 13 shows a further sample embodiment of a retouch generator for generating a retouch mask.

The retouch generator 39 additionally exhibits a mask memory 122 and a gate circuit 124 connected to said mask memory 122 via a data bus 123, said gate circuit 124 being post-connected to the retouch memory 49 and being disposed in the data bus 57. One memory location is allocated to each of the 512×512 image points of the color image in the mask memory 122 as well as in the image repetition memory 7 and in the retouch memory 49, and a mask information of one bit each can be deposited on said memory location. For example, those memory locations whose allocated image points belong to the retouch area are set to logical "H" and the remaining memory locations are set to logical "L". The filling of the mask memory 122 with the corresponding mask information for generating the desired retouch mask sequence is as follows.

In the case of a randomly shaped retouch area in the color image to be retouched, the boundary line of said retouch area is traced with the coordinate pen 51, whereby those memory locations of the mask memory 122 which are allocated to the image points of the traversed boundary line are addressed via the address bus 54'. At the same time, the evaluation circuit 48 deposits the mask information logical "H" on the memory locations called up via a further data bus 125. When the boundary line of the retouch mask is generated, all memory locations which belong to the image points of the retouch area or, respectively, of the retouch mask lying within the boundary line are automatically set to logical "H" and the memory locations which belong to the image points lying beyond the boundary line are set to logical "L".

This operation can be inverted by means of a control command proceeding from the input stage 37 via the control line 64 to the evaluation circuit 48, whereby that part of the color image lying beyond the boundary line is designated as the retouch area.

Given straight-line retouch areas, it suffices to solely mark the corner point coordinates of the boundary line for the retouch mask with the coordinate pen 51, whereas the complete boundary line is calculated on the basis of the input coordinates.

The generation of the retouch mask becomes particularly simple when the retouch surface has a rectangular shape, circular shape, etc., since, in this case, only the corresponding parameters need be input.

During the retouch operation, the mask memory 122 is addressed by the address control unit 8 via the address bus 54, whereby the image repetition memory 7, the retouch memory 49 and the mask memory 122 are read out synchronously and true to the image point. The mask information control the gate circuit 124 via the data bus 123 in such manner that the retouch factors read out of the retouch memory 49 given the mask information logical "H" (retouch area) are forwarded to the correction value generator 40 via the gate circuit 124, whereas the transmission of the retouch factors given the mask information logical "L" (remaining image) is blocked. Thereby, the remaining image which is not to be retouched automatically remains uninfluenced even though the retouch factors deposited in the retouch memory 49 would, per se, produce a correction there.

Figure 14:
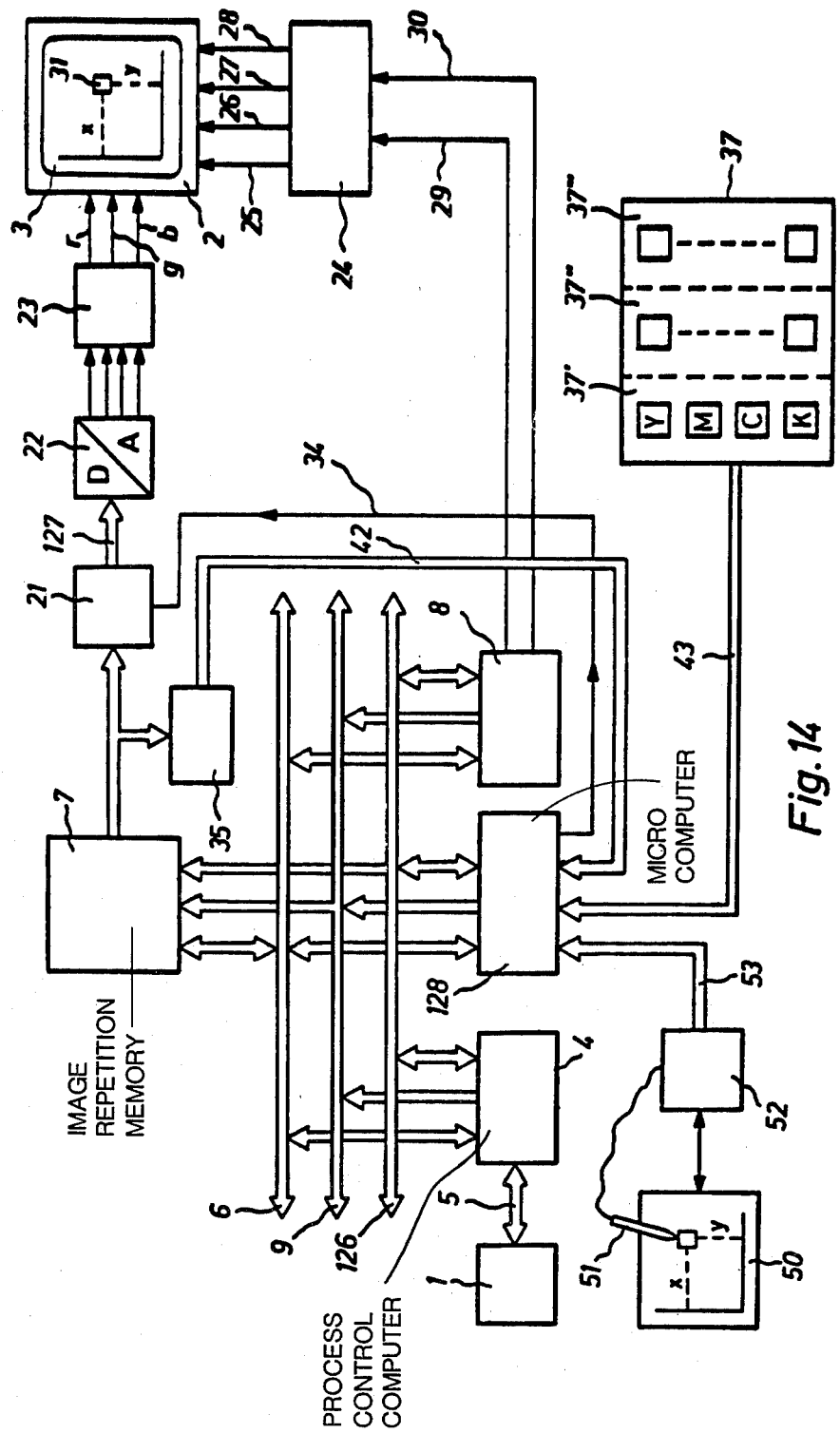
FIG. 14: a variation of the circuit arrangement.

FIG. 14 shows a variation of the circuit arrangement according to FIG. 1.

The digital color values F are loaded into the image repetition memory 7 from the storage medium 1 via the data busses 5 and 6 with the assistance of the process control computer 4. The process control computer 4 selects the corresponding memory addresses via the address bus 9 and supplies additional control signals to the control bus 126.

In order to display the color image on the color monitor 2, the memory control unit 8 cyclically calls up the addresses of the image repetition memory 7 via the address bus 9. The read-out color values F are supplied to the digital-to-analog converters 22 via a data bus 127 and are converted into analog color signals there.

The coordinate identification device again consists of the digitization tray 50, of the coordinate pen 51 and of the measuring stage 52.

The coordinates of the points contacted with the coordinate pin 51 on the digitization tray 50 are transferred into a microcomputer 128 via the data bus 53, the retouch factors r being determined in said micro-computer 128 from the coordinates. The color components prescribed in the input stage 37 are transferred to the micro-computer 128 via the data bus 43. The color components determined in the measured value memory 35 arrive at the micro-computer 128 via the data bus 42.

The micro-computer 128 calculates the color increments ΔF from the input color components and calculates the correction values $F_R$ from the color increments ΔF and from the retouch factors r.

The address bus 9 is disconnected from the memory control unit 8 during the vertical blanking gap of the image recording, this being signalled to the control bus 126 by the memory control unit 8.

The disconnected address bus 9 is then employed by the micro-computer 128 to address the memory locations of the image repetition memory 7 which correspond to the identified coordinates, to read the color values F deposited there into the micro-computer 128, and to add or to subtract the corresponding correction values $F_R$ according to the equation $F'=F\pm F_R$. Subsequently, the changed, digital color values F' are again reinscribed in the image repetition memory 7 via the data bus 6. During the next image repetition period, the retouched color image already appears on the picture screen 3 of the color monitor 2. The micro-computer 128 also controls the light mark generator 21 which generates the light mark 31 on the color monitor 2, said light mark being synchronized with the coordinate pen 51.

Commercial Utilization

The invention is advantageously employed in the entire area of electronic reproduction technology, particularly in the area of color image reproduction by means of electronic color scanners and color reproduction systems for the production of retouched and corrected printing forms in the form of color separations or printing cylinders.

We claim:

1. The method for the partial electronic retouching of colors in color images, in which color signals obtained by point-by-point and trichromatic scanning of color originals are digitized and the digital color values of the individual color components are stored in a storage medium, and in which the stored color values are corrected by color correction values, so as to obtain retouched colors comprising the steps of:
   (a) defining color increments values ($\Delta Y$, $\Delta M$, $\Delta C$, $\Delta K$) for said individual color components, said color increment values respectively representing the smallest amount of correction for said color values (Y, M, C, K) per retouching step;
   (b) selecting a positive or negative direction of retouching;
   (c) identifying the pairs of locus-coordinates of the image points to be retouched in the color image by marking the locationally allocated points in a coordinate identification device (digitizer) with a marking means of said device, such as a coordinate pen cursor;
   (d) during coordinate identification simultaneously determining the desired retouch strength for each image point to be retouched by generating a retouch factor (r) for each identified pair of locus-coordinates with said marking means, guiding said marking means similar to a retouch brush over that area of the coordinate identification device which corresponds to the area of the color image to be retouched, said retouch factor (r) representing a plurality of color increment values which are to be summed or to be subtracted at each image point which is to be retouched;
   (e) generating correction values ($Y_R$, $M_R$, $G_R$, $K_R$) for each image point which is to be retouched by multiplying the retouch factor (r) with the individual color increment values; and
   (f) correcting said color values (Y, M, C, K) of the image points which are to be retouched by adding for positive retouching and subtracting for negative retouching said corresponding correction values ($Y_R$, $M_R$, $C_R$, $K_R$) of said image points in order to obtain corrected color values (Y', M', C', K') representing the retouched colors in said color image.

2. The method according to claim 1 wherein the retouch factor (r) of an image point is generated by the number of contacts of said marking means with said corresponding point in said coordinate identification device, whereby the retouch factor (r) increases (intensification for positive retouching) or decreases intensification for negative retouching) by an incremental amount on each contact.

3. The method according to claim 1, wherein the retouch factor (r) of an image point is generated by the pressure of the marking means on the corresponding point in said coordinate identification device, whereby the retouch factor (r) increases (intensification for positive retouching) or decreases (intensification for negative retouching) by an amount proportional to the pressure.

4. The method according to claim 1, wherein the retouch factor (r) of an image point is generated from the dwell time of said marking means on the corresponding point in said coordinate identification device, whereby the retouch factor (r) increases (intensification for positive retouching) or decreases (intensification for negative retouching) by an amount proportional to the dwell time.

5. The method according to claim 1, further comprising the steps of:
   (a) displaying said color original or said retouched color image on a color monitor for visual control;
   (b) generating a moveable light mark on the screen of said color monitor; and
   (c) synchronizing the motion of said light mark with the motion of the marking means of said coordinate identification device, said light mark visibly indicating in said color original or said retouched color image the image points marked by said marking means.

6. The method according to claim 1 or 5, further comprising the steps of:
   (a) transferring the color values (Y, M, C, K) of the color image from said storage medium into an image refresh memory;
   (b) writing the generated retouch factors (r) of the image points to be retouched into a retouch memory;
   (c) reading out synchronously the retouch factors (r) from said retouch memory and the color values (Y, M, C, K) from said image refresh memory;
   (d) generating said correction values ($Y_R$, $M_R$, $C_R$, $K_R$);
   (e) correcting said read out color values (Y, M, C, K) by said generated correction values ($Y_R$, $M_R$, $C_R$, $K_R$) to obtain said retouched color values (Y', M', C', K'); and
   (f) converting said color values (Y, M, C, K) of said color original or said retouched color values (Y', M', C', K') of said retouched color image into control signals for said color monitor.

7. The method according to claim 6, wherein the generated retouch factors (r) are respectively written into the retouch memory during the blanking interval of said color monitor.

8. The method according to claim 1, wherein the amounts of said individual incremental values are defined in a manner such that the incremental change of the retouch value obtained for one retouching step is not discernible by the operator.

9. The method according to claim 8, wherein the amounts of said individual incremental values are selected to be smaller than the least significant bit (LSB) of the color values (Y, M, C, K).

10. The method according to claim 1, wherein the defining step of said individual increment values is further defined by:
   (a) selecting a desired target color which may be obtained by said retouching process; and
   (b) subdividing each color value (Y, M, C, K) of said target color into the same plurality of individual color incremental values ($\Delta Y$, $\Delta M$, $\Delta C$, $\Delta K$) for determination of the smallest increment of correction per retouching step.

11. The method according to claim 1, wherein the defining step of the individual increment values is further defined by:
   (a) measuring a desired target color in said color image, which may be obtained by said retouching process; and
   (b) subdividing each color value (Y, M, C, K) of said target color into the same plurality of individual colorincremental values ($\Delta Y$, $\Delta M$, $\Delta C$, $\Delta K$) for determination of the smallest increment of correction per retouching step.

12. The method according to claim 1, wherein the defining step of said individual increment values is further defined by:
   (a) determining a desired target color, which may be obtained by said retouching process;
   (b) determining an initial color, from which the retouching process may be started;
   (c) generating the difference of the color values (Y, M, C, K) of said target color and said initial color; and
   (d) subdividing each difference into the same plurality of individual color incremental values ($\Delta Y$, $\Delta M$, $\Delta C$, $\Delta K$) for determination of the smallest increments of correction per retouching step.

13. The method according to claim 10 or 11, wherein the individual increment values ($\Delta Y$, $\Delta M$, $\Delta C$, $\Delta K$) are formed as quotients from the color values (Y, M, C, K) of the target color and the number of correction steps desired to obtain said target color.

14. The method according to claim 12, wherein the individual increment values ($\Delta Y$, $\Delta M$, $\Delta C$, $\Delta K$) are formed as quotients from the differences of color values and the number of correction steps desired to obtain said target color from said initial color.

15. The method according to claim 12 or 14, wherein the differences of the color values of a target color and of an initial color represent the color values of a retouch color.

16. The method according to claim 12 or 14, wherein the target color and the initial color are separation colors.

17. The method according to claim 1, further comprising the steps of:
   (a) defining a desired target color, which may be obtained by said retouching process;
   (b) defining an initial color, from which said retouching process may be started; and
   (c) subtracting color correction values ($Y_R$, $M_R$, $C_R$, $K_R$) from the color values (Y, M, C, K) of said initial color so as to brighten said initial color, whereby said target color is "white".

18. The method according to claim 1, further comprising the steps of:
   (a) defining a desired target color, which may be obtained by said retouching process;
   (c) defining an initial color, from which said retouching process may be started; and
   (c) adding color correction values ($Y_R$, $M_R$, $C_R$, $K_R$) to the color values (Y, M, C, K) of said initial color so as to darken said initial color, whereby said target color is "black".

19. The method according to claim 1, further comprising the steps of:
   (a) defining an initial color, from which said retouching process may be started;
   (b) adding color correction values ($Y_R$, $M_R$, $C_R$, $K_R$) to the color values (Y, M, C, K) of said initial color so as to darken said initial color, whereby the color values (Y, M, C, K) of the initial color increase proportionally during the retouching process until the greatest color value of the initial color has achieved its maximum density (black), and then
   (c) continuing the retouching process by adding selected color correction values to said color values of said initial color, whereby the color values (Y, M, C) of the chromatic components of said initial color retain their values and only the color value (K) of the non-chromatic component of said initial color increases up to the maximum density.

20. The method according to claim 1, further comprising the steps of:
   (a) defining an initial color, from which said retouching process may be started;
   (b) adding color correction values ($Y_R$, $M_R$, $C_R$, $K_R$) to the color values (Y, M, C, K) of said initial color so as to darken said initial color, whereby the color values (Y, M, C, K) of the initial color increase proportionally during the retouching process until the greatest color value of the initial color has achieved its maximum density (black), and then
   (c) continuing the retouching process by adding selected color correction values to said color values of said initial color, whereby the color component retains the color value achieved at the maximum density and the color values of the other components increase until the components achieve the maximum density.

21. The method according to claim 1, further comprising the steps of:
   (a) storing the plurality of pairs of locus-coordinates in the sequence of their identification by said marking means of said coordinate identification devices;
   (b) calling up selected locus coordinates from said plurality in reversed sequence; and
   (c) reducing the retouch factors (r) corresponding to said selected locus coordinates, whereby the retouch strength achieved during the preceding retouching process within an area of said color image defined by said selected locus coordinates is reduced true to the contours of said area.

22. The method according to claim 1, wherein the overall retouch process can be reversed by erasing said generated retouch factors (r).

23. The method according to claim 1, further comprising the steps of:
   (a) identifying simultaneously a plurality of locus-coordinates-pairs of the image points to be retouched with said marking means of said coordinate identification device; and
   (b) generating simultaneously a plurality of corresponding retouch factors (r), whereby the area retouched by said marking means is increased and a plurality of image points are retouched simultaneously.

24. The method according to claim 23, wherein the retouch factors (r) are only changed when a new pair of locus-coordinates identified with said marking means differ from a previously identified pair of locus-coordinates by a minimum amount in the X- and Y-direction of said coordinate identification device, and whereby said minimum amount determines the extension of said area of retouching.

25. The method according to claim 1, further comprising the steps of:
   (a) identifying simultaneously a plurality of locus-coordinate-pairs of the image points to be retouched with said marking means of said coordinate identification device;
   (b) generating simultaneously a plurality of corresponding retouch factors (r), whereby the area of retouch of said marking means is increased and a plurality of image points are retouched simultaneously;
   (c) displaying said color original or said retouched color image on a color monitor for visual control;
   (d) generating a moveable enlarged light mark on the screen of said color monitor; and
   (e) synchronizing the motion of said light mark with the motion of said marking means, said light mark making visible in said color original or retouched color image the plurality of image points within said area of retouch of said marking means.

26. The method according to claim 1, wherein the part of the color image to be retouched is limited by means of an electronically generated retouch mask.

27. Apparatus for partial electronic retouching of colors in color images in which color signals obtained by point-by-point and trichromatic scanning of color originals are digitized and the digital color values of the individual color components are stored in a storage medium, comprising
   (a) an image refresh memory (7) for the digital color values;
   (b) a color monitor for displaying said color original or said retouched color image;
   (c) a color generator (38) for the formation of color incremental values ($\Delta Y$, $\Delta M$, $\Delta C$, $\Delta K$);
   (d) a retouch generator (39) for the formation of retouch factors (r) of the image points to be retouched in the color image;
   (e) a correction value generator (40) connected to the color generator (40) and the retouch generator (39) for formation of correction values ($Y_R$, $M_R$, $C_R$, $K_R$) from said color incremental values ($\Delta Y$, $\Delta M$, $\Delta C$, $\Delta K$) and said retouch factors (r); and
   (f) combining stages (15, 16, 17, 18) arranged in the color channels and connected to said image refresh memory (7), to said color monitor (2) and to said correction value generator (40) for the correction of the color values (Y, M, C, K) stored in said refresh memory (7) by means of said correction color values ($Y_R$, $M_R$, $C_R$, $K_R$) so as to obtain retouched color values (Y', M', C', K').

28. Apparatus according to claim 27, wherein said retouch generator (39) consists of:
   (a) a coordinate identification device (50) having marking means (51), particularly a cursor, for identifying the pairs of locus-coordinates of image points to be retouched;
   (b) an evaluation circuit (52) connected to said coordinate identification device (50) for generating the retouch factors (r) from said pairs of locus-coordinates; and
   (c) a retouch memory (49) connected to said evaluation circuit (52) for storing said generated retouch factors (r).

29. Apparatus according to claim 27, wherein said correction value generator (40) consists of a plurality of multiplication stages.

30. Apparatus according to claim 27, further comprising an input stage (37) connected to the color generator (38).

31. Apparatus according to claim 27, further comprising a measuring device (8, 21, 32, 35) connected to the color generator (38) for color measurement in the color image displayed on said color monitor (2).

* * * * *

UNITED STATES PATENT AND TRADEMARK OFFICE
Certificate

Patent No. 4,393,399  Patented: July 12, 1983

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Uwe Gast, Rammsee, Federal Republic of Germany; Eberhard Hennig, Aschberg, Federal Republic of Germany; Dieter Preuss, Kiel, Federal Republic of Germany; Heinz Taudt, Kiel, Federal Republic of Germany; Klaus Wellendorf, Heikendorf, Federal Republic of Germany; and Dr. Jürgen Klie, Tökendorf, Federal Republic of Germany.

Signed and Sealed this Twenty-Ninth Day of January 2002.

REINHARD J. EISENZOPF
*Supervisory Patent Examiner*
Art Unit 2614